(12) United States Patent
Saneto et al.

(10) Patent No.: US 9,507,202 B2
(45) Date of Patent: Nov. 29, 2016

(54) POLARIZATION PLATE AND LIQUID CRYSTAL DISPLAY

(71) Applicant: FUJIFILM Corporation, Tokyo (JP)

(72) Inventors: Ryuji Saneto, Kanagawa (JP); Humitake Mitobe, Kanagawa (JP); Jun Noguchi, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 14/532,561

(22) Filed: Nov. 4, 2014

(65) Prior Publication Data

US 2015/0062502 A1     Mar. 5, 2015

Related U.S. Application Data

(63) Continuation of application No. PCT/JP2013/062052, filed on Apr. 24, 2013.

(30) Foreign Application Priority Data

May 24, 2012   (JP) ................................. 2012-118681
Oct. 18, 2012   (JP) ................................. 2012-231059

(51) Int. Cl.
    *G02F 1/1335*     (2006.01)
    *G02B 1/10*     (2015.01)
    *G02B 5/30*     (2006.01)
    (Continued)

(52) U.S. Cl.
    CPC ......... *G02F 1/133528* (2013.01); *G02B 1/105* (2013.01); *G02B 5/3033* (2013.01); *B32B 23/08* (2013.01); *B32B 2457/202* (2013.01);
    (Continued)

(58) Field of Classification Search
    CPC ................ G02B 1/105; G02B 5/3033; G02F 1/133528; B32B 23/08; B32B 2457/202; C08B 3/06; Y10T 428/1041; Y10T 428/105
    See application file for complete search history.

(56) References Cited

U.S. PATENT DOCUMENTS 8,648,982 B2    2/2014   Yanai et al.
2006/0246232 A1*   11/2006   Kubo et al. ................. 428/1.31
(Continued)

FOREIGN PATENT DOCUMENTS

JP     2006-030962 A     2/2006
JP     2008-020890 A     1/2008
(Continued)

OTHER PUBLICATIONS

International Search Report issued in PCT/JP2013/062052 on Jun. 4, 2013.
(Continued)

*Primary Examiner* — Ellen S Wood
*Assistant Examiner* — Eli D Strah
(74) *Attorney, Agent, or Firm* — Jean C. Edwards, Esq.; Edwards Neils LLC

(57) ABSTRACT

A polarization plate includes a first protective film, a polarizer, and a second protective film in this order, in which the first protective film is a film including a (meth)acryl-based resin, a thickness of the first protective film is in a range of 20 μm to 30 μm, a thickness of the second protective film is in a range of 1.5 times to 1.8 times of the thickness of the first protective film, and a humidity dimensional change ratio of the second protective film in the direction orthogonal to an absorption axis of the polarizer is in a range of 0.45% to 0.8%.

7 Claims, 3 Drawing Sheets

(51) Int. Cl.
 *C08B 3/06* (2006.01)
 *B32B 23/08* (2006.01)
(52) U.S. Cl.
 CPC ............. *C08B 3/06* (2013.01); *Y10T 428/105* (2015.01); *Y10T 428/1041* (2015.01)

(56) References Cited

U.S. PATENT DOCUMENTS

| | | | |
|---|---|---|---|
| 2008/0254236 | A1 | 10/2008 | Kawanishi et al. |
| 2010/0308264 | A1* | 12/2010 | Furukawa et al. ....... 252/299.01 |
| 2012/0320316 | A1* | 12/2012 | Yanai et al. .................... 349/96 |

FOREIGN PATENT DOCUMENTS

| | | |
|---|---|---|
| JP | 2008-529038 A | 7/2008 |
| JP | 2008-203400 A | 9/2008 |
| JP | 2008-203460 A | 9/2008 |
| JP | 2008-217021 A | 9/2008 |
| JP | 2009-249386 A | 10/2009 |
| JP | 2009-292869 A | 12/2009 |
| JP | 2009-294262 A | 12/2009 |
| JP | 2009292869 A * | 12/2009 ............ B29C 55/14 |
| JP | 2010-271619 A | 12/2010 |
| JP | 10-2012-0004440 A | 1/2012 |
| JP | 2012-018421 A | 1/2012 |
| JP | 2012-048181 A | 3/2012 |
| KR | 10-2005-0031439 A | 4/2005 |
| KR | 10-2009-0080963 A | 7/2009 |
| WO | 2006/082818 A1 | 8/2006 |
| WO | 20071145081 A1 | 12/2007 |
| WO | 2008/102624 A1 | 8/2008 |
| WO | WO 2011102492 A1 * | 8/2011 ............... G02B 5/30 |

OTHER PUBLICATIONS

Written Opinion issued in PCT/JP2013/062052 on Jun. 4, 2013.
Notification of Reasons for Refusal issued by the Korean Intellectual Property Office on Apr. 3, 2015 in connection with Korean Patent Application No. 10-2014-7031094.
Notice Requesting Submission of Opinion issued by the Korean Intellectual Property Office on Sep. 2, 2015 in connection with Korean Patent Application No. 10-2014-7031094.

* cited by examiner

POLARIZATION PLATE AND LIQUID CRYSTAL DISPLAY

CROSS-REFERENCE TO RELATED APPLICATIONS

This application is a Continuation of PCT International Application No. PCT/JP2013/062052 filed on Apr. 24, 2013, which was published under PCT Article 21(2) in Japanese, which claims priority under 35 U.S.C §119(a) to Japanese Patent Application No. 2012-118681 filed on May 24, 2012 and Japanese Patent Application No. 2012-231059 filed on Oct. 18, 2012. The above applications are hereby expressly incorporated by reference, in their entirety, into the present application.

BACKGROUND OF THE INVENTION

1. Field of the Invention

The present invention relates to a polarization plate and a liquid crystal display.

2. Description of the Related Art

A liquid crystal display is a space-saving image display with small power consumption, and its application is widening every year. In the past, liquid crystal displays had a serious defect of a large viewing angle dependency of a displayed image, but a wide viewing angle liquid crystal mode such as a VA mode or an IPS mode has been put into practical use, and accordingly, the demand of the liquid crystal displays is rapidly expanding even in a market requiring a high-quality image such as a television.

In response to the expansion of the application of liquid crystal displays, there has been a demand for a larger size and higher-quality texture of liquid crystal displays. In the peripheral portion of a screen, there is a portion corresponding to a frame, which is called a bezel, and the width of the bezel is becoming narrower to produce a higher-quality texture. The bezel plays a role of aesthetically completing display by hiding the edge section of a polarization plate, and in response to the decrease in the width of the bezel, there has been a demand for a high-level attachment accuracy between a liquid crystal cell and the polarization plate.

The polarization plate used for liquid crystal displays has a configuration in which, generally, transparent protective films are attached to the front and back sides of a polarizer made of a polyvinyl alcohol film or the like in which iodine or a dye is adsorbed and oriented. As the polarization plate protective film, a cellulose acylate-based polarization plate protective film represented by cellulose acetate has been widely used since the cellulose acylate-based polarization plate protective film has high transparency and is capable of easily ensuring adhesiveness to polyvinyl alcohol which is used for the polarizer. Generally, the adhesiveness is obtained by carrying out a saponification treatment on the protective film to impart hydrophilicity to the surface.

For the reasons of its relatively high water vapor transmission rate and its capability of easily ensuring the adhesiveness to polyvinyl alcohol through a saponification treatment, the cellulose acylate film has been used, but its relatively strong water-absorbing property has caused a problem of a likelihood of the occurrence of a uneven screen in a case in which the humidity dependency of retardation is great, and the cellulose acylate film is used for a long period of time.

JP2009-292869A discloses a polarization plate in which an acryl-based film is used on one side, and a cellulose acylate film is used on the other side as the protective films for the polarizer.

In addition, JP2008-529038A discloses a polarization plate in which a cycloolefin-based polymer film is used on one side, and a cellulose acylate film is used on the other side as the protective films for the polarizer.

SUMMARY OF THE INVENTION

The acryl-based polymer film has properties of a weaker water-absorbing property and a smaller photoelastic coefficient than the cellulose acylate film. Therefore, when the acryl-based polymer film is used as the polarization plate protective film, there has been a problem in that, in a case in which the polarization plate is produced using a method in which a polyvinyl alcohol glue is used, which has been generally used thus far, in a drying step after the protective films are attached to both sides of the polarizer, moisture is not sufficiently vaporized due to the low water vapor transmission rate of the acryl-based polymer film, and thus the polarization function degrades.

In addition, since the polarization plate of JP2009-292869A has a configuration in which the acryl-based film is used on one side of a polarizer, and the cellulose acylate film is used on the other side thereof as the protective films for the polarizer, it is considered that, after being produced, the polarization plate is sufficiently dried, and the characteristics of the acryl-based film can be used.

However, in a case in which the curling of the polarization plate of JP2009-292869A is observed when the polarization plate is placed on a flat plate with the cellulose acylate film on the flat plate side (bottom side) and the acryl-based film on the top side, there is a case in which the polarization plate is curled, and thus four corners of the polarization plate are bent up. The polarization plate curled as described above is referred to as "the polarization plate curled toward the acryl-based film side". When the polarization plate curled toward the acryl-based film side is attached to a liquid crystal cell with the acryl-based film used as an inner side film, there is a problem in that air bubbles enter between the inner side film and the liquid crystal cell, and the performance of the liquid crystal display degrades. Therefore, the polarization plate is preferably curled toward the opposite side of the acryl-based film. However, when the polarization plate is excessively curled, alignment becomes difficult during the attachment between the liquid crystal cell and the polarization plate, and thus the polarization plate being curled toward the opposite side is also not preferred. Since the strict alignment accuracy has been required in response to the decrease in the width of the bezel as described above, the curling-related demand has been becoming stricter.

Here, the inner side film refers to, among two protective films sandwiching the polarizer, the film disposed on a side of the liquid crystal cell. In addition, the film disposed on the opposite side of the liquid crystal cell is called an outer side film.

In addition, since the film thickness of the inner side film is preferably thinner from the viewpoint of light leakage when the polarization plate is attached to the liquid crystal cell, and the film thickness of the outer side film is preferably thicker from the viewpoint of the scratch resistance of the polarization plate, the polarization plate having the inner side film and the outer side film with different film thicknesses can be considered; however, even in this case, the polarization plate is likely to be curled as described above.

In the polarization plate described in JP2008-529038A, the protective film having a thickness of 60 μm or more is used; however, in recent years, there has been a demand for a thinner protective film. However, when the protective film is thinned, there is a problem in that the polarization plate is more likely to be curled.

The curling of the polarization plate in both MD and TD directions poses a problem, and is important. However, in a case in which a material configuring the polarization plate is designed, the curling in the TD direction is particularly important. This is because the degrees of the ease for adjusting the curling using the process for producing the polarization plate are different. For the curling in the MD direction, a range is wide in which the curling can be adjusted by changing tension in a conveyance direction when the inner side film, the polarizer, and the outer side film, which configure the polarization plate, are conveyed for attachment and drying. However, for the curling in the TD direction, there is no means for controlling the curling except for a change in the drying conditions which only slightly adjusts the curling. Therefore, it becomes important to design a preferable combination of films particularly for the curling in the TD direction.

An object of the invention is to provide a polarization plate that is excellent in terms of polarization plate processing suitability and the producing suitability of a liquid crystal display from the viewpoint of curling.

As a result of studies, the present inventors found that the curling of a polarization plate in which a (meth)acryl-based resin film was used on one side of a polarizer was significantly changed depending on the thickness of a second protective film on the other side of the polarizer. This cannot be explained using the imbalance of the elastic modulus which is assumed to be a cause of curling in JP2008-529038A. The cause of the above-described thickness dependency has not been sufficiently clarified, but it is considered that the cause of the occurrence of curling is the influence of the shrinkage of the polarizer on the curling in addition to the balance of the elastic modulus of the film or the dimensional change during humidity change between the front and back. It is assumed that a change in the thickness of the protective film causes a change in the degree of curling caused by the shrinkage of the polarizer. It is considered that the shrinkage of the polarizer acts so that the polarization plate is curled toward a side of the protective film having a thinner film thickness. As a result of additional studies on the basis of the above-described assumption, it was found that, when a film having a significant humidity dimensional change is used as the second protective film, it is possible to reduce curling toward a first protective film.

That is, it was found that, in a polarization plate having a configuration in which a first protective film including a (meth)acryl-based resin is provided on one side of a polarizer, and a second protective film is provided on the other side as the protective films for the polarizer, to suppress curling toward the first protective film, it is necessary to preferably design the humidity dimensional change ratio of the second protective film in a direction orthogonal to an absorption axis of the polarizer.

That is, the object is achieved by the present invention having the following configuration.

[1] A polarization plate including a first protective film, a polarizer, and a second protective film in this order,
in which the first protective film is a film including a (meth)acryl-based resin,
a thickness of the first protective film is in a range of 20 μm to 30 μm,
an elastic modulus of the first protective film in a direction orthogonal to an absorption axis of the polarizer is in a range of 3.0 GPa to 3.5 GPa,
a thickness of the second protective film is in a range of 1.5 times to 1.8 times of the thickness of the first protective film, and
a humidity dimensional change ratio of the second protective film in the direction orthogonal to the absorption axis of the polarizer, which is expressed by the following expression (1), is in a range of 0.45% to 0.8%, humidity dimensional change ratio (%)=[{(length at 25° C. and a relative humidity of 80%)−(length at 25° C. and a relative humidity of 10%)}/ (length at 25° C. and a relative humidity of 60%)]×100  Expression (1).

[2] The polarization plate according to [1], in which a humidity dimensional change ratio of the first protective film in the direction orthogonal to the absorption axis of the polarizer, which is expressed by the above-described expression (1) is in a range of 0.20% to 0.30%.

[3] The polarization plate according to [1] or [2], in which the humidity dimensional change ratio of the second protective film in the direction orthogonal to the absorption axis of the polarizer, which is expressed by the above-described expression (1) is in a range of 0.55% to less than 0.65%.

[4] The polarization plate according to any one of [1] to [3], in which an elastic modulus of the second protective film in the direction orthogonal to the absorption axis of the polarizer is in a range of 2.8 GPa to less than 3.3 GPa.

[5] The polarization plate according to any one of [1] to [4], in which the humidity dimensional change ratio of the second protective film in the direction orthogonal to the absorption axis of the polarizer, which is expressed by the above-described expression (1), is in a range of 0.55% to less than 0.65%, and the elastic modulus of the second protective film in the direction orthogonal to the absorption axis of the polarizer is in a range of 2.8 GPa to less than 3.3 GPa.

[6] The polarization plate according to any one of [1] to [5], in which the second protective film is a film including cellulose acylate.

[7] The polarization plate according to any one of [1] to [6], including an adhesive layer, the first protective film, the polarizer, and the second protective film in this order.

[8] A liquid crystal display including a liquid crystal cell and at least one polarization plate according to any one of [1] to [7], in which the first protective film in the polarization plate is disposed on a side of the liquid crystal cell.

According to the present invention, a polarization plate that is excellent in terms of polarization plate processing suitability and the producing suitability of a liquid crystal display from the viewpoint of curling can be obtained.

DESCRIPTION OF THE PREFERRED EMBODIMENTS

Hereinafter, embodiments for carrying out the present invention will be described in detail, but the invention is not limited thereto. In the present specification, in a case in which numeric values indicate property values, characteristics values, and the like, the expression "(numeric value 1) to (numeric value 2)" indicates "equal to or more than (numeric value 1) and equal to or less than (numeric value 2)". In addition, in the present specification, the expression "(meth)acryl-based resin" indicates "at least any one of an acryl-based resin and a methacryl-based resin". This shall apply to "(meth)acrylate", "(meth)acryloyl", and the like.

A polarization plate of the present invention is a polarization plate including a first protective film, a polarizer, and a second protective film in this order, in which the first protective film is a film including a (meth)acryl-based resin, a thickness of the first protective film is in a range of 20 μm to 30 μm, an elastic modulus of the first protective film in a direction orthogonal to an absorption axis of the polarizer is in a range of 3.0 GPa to 3.5 GPa, a thickness of the second protective film is in a range of 1.5 times to 1.8 times of the thickness of the first protective film, and a humidity dimensional change ratio of the second protective film in the direction orthogonal to the absorption axis of the polarizer, which is expressed by the following expression (1), is in a range of 0.45% to 0.8%, humidity dimensional change ratio (%)=[{(length at 25° C. and a relative humidity of 80%)−(length at 25° C. and a relative humidity of 10%)}/ (length at 25° C. and a relative humidity of 60%)]×100    Expression (1).

Figure 1:
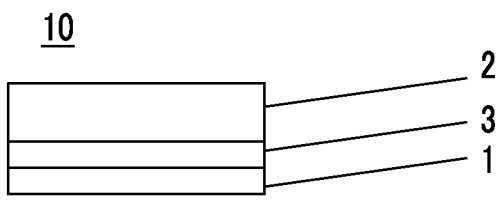
FIG. 1 is a schematic view illustrating an example of a polarization plate of the present invention.

The polarization plate of the present invention includes the first protective film, the polarizer, and the second protective film in this order. An example of the polarization plate of the present invention is illustrated in FIG. 1. A polarization plate 10 in FIG. 1 includes a first protective film 1, a polarizer 3, and a second protective film 2 in this order.

Hereinafter, the polarizer and the protective film which configure the polarization plate of the present invention will be described.

[Polarizer]

There is no particular limitation regarding the polarizer in the polarization plate of the present invention, and a well-known polarizer can be used. The polarizer preferably includes a polyvinyl alcohol-based resin and a dichroism pigment.

(Polyvinyl Alcohol-Based Resin)

The polyvinyl alcohol-based resin (hereinafter, also referred to as "PVA-based resin") is preferably a polymer material obtained by saponifying polyvinyl acetate, and may contain a component capable of copolymerizing with vinyl acetate such as unsaturated carboxylic acid, unsaturated sulfonic acid, an olefin, or a vinyl ether. In addition, denatured PVA containing an acetoacetyl group, a sulfonic acid group, a carboxyl group, an oxyalkylene group, or the like can also be used.

Additionally, in the polarizer in the present invention, a PVA film having a 1,2-glycol bonding amount of 1.5 mol % or less described in JP3021494B, a PVA film containing 500 or less particles of an optical foreign substance having a size of 5 μm or greater per 100 square centimeters described in JP2001-316492A, a PVA film having a hydrothermal cut-through temperature spot of 1.5° C. or lower in the TD direction described in JP2002-030163A, and furthermore, a PVA film produced from a solution containing 1 mass % to 100 mass % of a polyvalent (trivalent to hexavalent) alcohol such as glycerine or a solution containing 15 mass % or more of a plasticizer described in JP1994-289225A (JP-H06-289225) can be preferably used.

Among the above-described materials, the polyvinyl alcohol-based resin used for the polarizer in the invention is preferably saponified polyvinyl acetate from the viewpoint of manufacturing costs. The degree of saponification of the polyvinyl acetate is not particularly limited, but is preferably, for example, 90% or more, more preferably 95% or more, and particularly preferably 99% or more.

The weight-average molecular weight of the polyvinyl alcohol-based resin used for the polarizer in the present invention is not particularly limited, but is preferably in a range of 100000 to 300000, more preferably in a range of 140000 to 260000, and particularly preferably in a range of 150000 to 200000.

(Dichroism Pigment)

The polarizer in the present invention preferably includes a dichroism pigment. In the present specification, the dichroism pigment refers to a pigment having an absorbance which varies depending on the polarization direction, and examples thereof include an iodine ion, a diazo-based pigment, a quinone-based pigment, a well-known dichroism pigment, and the like. As the dichroism pigment, a high-order iodine ion such as I3- or I5- or a dichroism pigment can be preferably used.

In the present invention, the high-order iodine ion is particularly preferably used. The high-order iodine ion can be generated in a state of being adsorbed to and oriented in PVA by immersing the PVA in at least one of a liquid obtained by dissolving iodine in a potassium iodide aqueous solution and a boric acid aqueous solution, and the iodine is as described in "The application of the Polarization Plate", Nagata Ryo, CMC Publishing Co., Ltd. and Industrial Materials, Vol. 28, Issue 7, pp. 39 to 45.

[Method for Producing Polarizer]

The method for producing the polarizer in the present invention is not particularly limited.

For example, as the method for producing the polarizer including PVA and iodine, it is preferable to make the PVA into a film and then introduce iodine, thereby configuring the polarizer. A PVA film can be produced with reference to the method described in 0213 to 0237 in JP2007-86748A, the specification of JP3342516B, JP1997-328593A (JP-H09-328593A), JP2001-302817A, JP2002-144401A, and the like.

Among the above-described methods, the method for producing the polarizer in the present invention preferably includes a step of forming a film using a polyvinyl alcohol-based resin solution including a polyvinyl alcohol-based resin, a step of stretching the polyvinyl alcohol-based resin film, and a step of dyeing the stretched polyvinyl alcohol-based resin film using the dichroism pigment.

Specifically, in the method for producing the polarizer, it is particularly preferable to carry out a polyvinyl alcohol-based resin solution (hereinafter, also referred to as "PVA solution") preparation step, a flow casting step, a swelling step, a dyeing step, a film-hardening step, a stretching step, and a drying step in this order. In addition, an online surface state inspection step may be provided in the middle of or after the above-described steps.

(Preparation of PVA Solution)

In the PVA solution preparation step, it is preferable to add a PVA-based resin to water under stirring, and prepare a raw liquid including the PVA-based resin dissolved in water or an organic solvent. The concentration of the PVA-based resin in the raw liquid is preferably in a range of 5 mass % to 20 mass %. In addition, a PVA-based resin wet cake having a water content ratio of approximately 40% may be temporarily prepared by dehydrating an obtained slurry. Furthermore, in a case in which an additive is added afterwards, a method in which the PVA-based resin wet cake is put into a dissolution bath, a plasticizer and water are added, and the components are stirred while water vapor is blown away from the bath bottom is preferred. The inside resin temperature is preferably heated to a temperature in a range of 50° C. to 150° C., and the inside of the system may be pressurized.

(Flow Casting)

As the flow casting method, a method in which a film is formed through the flow casting of the raw liquid (PVA solution) prepared above is generally and preferably used. There is no particular limitation regarding the method for flow casting, but it is preferable to supply the heated raw liquid to a twin screw extruder, and flow-cast the raw liquid on a support from discharging means (preferably a die, and more preferably a T-shaped slit die) using a gear pump. There is no particular limitation regarding the temperature of the resin solution discharged from the die.

The support is preferably a casting drum, and there is no particular limitation regarding the diameter, width, rotation speed, and surface temperature of the drum. The diameter (R1) of the casting drum is preferably in a range of 2000 mm to 5000 mm, more preferably in a range of 2500 mm to 4500 mm, and particularly preferably in a range of 3000 mm to 3500 mm.

The width of the casting drum is preferably in a range of 2 m to 6 m, more preferably in a range of 3 m to 5 m, and particularly preferably in a range of 4 m to 5 m.

The rotation speed of the casting drum is preferably in a range of 2 m/minute to 20 m/minute, more preferably in a range of 4 m/minute to 12 m/minute, and particularly preferably in a range of 5 m/minute to 10 m/minute.

The casting drum surface temperature of the casting drum is preferably in a range of 40° C. to 140° C., more preferably in a range of 60° C. to 120° C., and particularly preferably in a range of 80° C. to 100° C.

The resin temperature at the T-shaped slit die exit is preferably in a range of 40° C. to 140° C., more preferably in a range of 60° C. to 120° C., and particularly preferably in a range of 80° C. to 100° C.

After that, the back surface and front surface of the obtained roll are preferably dried by being alternately passed through a drying roll. There is no particular limitation regarding the diameter, width, rotation speed, and surface temperature of the drying roll. The diameter (R2) of the drying roll is preferably in a range of 200 mm to 450 mm, more preferably in a range of 250 mm to 400 mm, and particularly preferably in a range of 300 mm to 350 mm.

There is no particular limitation as well regarding the length of the obtained film, and it is possible to produce a long film having a length of 2000 m or longer, and preferably 4000 m or longer. The width of the film is also not particularly limited, and is preferably in a range of 2 m to 6 m, and more preferably in a range of 3 m to 5 m.

(Swelling)

The swelling step is preferably carried out using only water, but it is also possible to manage the degree of swelling of a polarization plate base material by swelling the polyvinyl alcohol-based resin film using a boric acid aqueous solution to stabilize the optical performance and avoid the generation of wrinkles in the polyvinyl alcohol-based resin film (hereinafter, also referred to as "PVA film") in a manufacturing line as described in JP1998-153709A (JP-H10-153709A).

The temperature and time during the swelling step can be arbitrarily determined, but are preferably in a range of 10° C. to 60° C. and a range of 5 seconds to 2000 seconds respectively.

The film may be slightly stretched during the swelling step, and, for example, is preferably stretched 1.05 times to 1.5 times, and more preferably stretched approximately 1.3 times.

(Dyeing)

For the dyeing step, it is possible to use the method described in JP2002-86554A. As the dyeing method, not only immersion but also arbitrary means such as the application or spraying of iodine or a dye solution can be used. In addition, a method in which the film is dyed while stirring the concentration of iodine, the dyeing bath temperature, the stretching ratio in the bath, and the solution in the bath may be used as described in JP2002-290025A.

In a case in which a high-order iodine ion is used as the dichroism pigment, to obtain a high-contrast polarization plate, a liquid obtained by dissolving iodine in a potassium iodide aqueous solution is preferably used in the dyeing step. In this case, the mass ratio between iodine and potassium iodide in the iodine-potassium iodide aqueous solution described in JP2007-086748A can be adopted.

In addition, a boron-based compound such as boric acid or borax may be added to a dyeing solution as described in JP3145747B.

(Film Curing)

In the film curing step, it is preferable to soak a crosslinking agent by immersing the PVA film in a crosslinking agent solution or applying the solution. In addition, it is also possible to carry out the film curing step several times as described in JP1990-52130A (JP-H11-52130A).

The crosslinking agent described in the specification of US RE232897E can be used as the crosslinking agent, and as described in JP3357109B, it is also possible to use a polyvalent aldehyde as the crosslinking agent to improve dimensional stability, but boric acids are most preferably used. In a case in which boric acid is used as the crosslinking agent used in the film-hardening step, a metal ion may be added to the boric acid-potassium iodide aqueous solution. The metal ion is preferably zinc chloride, and as described in JP2000-35512A, it is also possible to use halogenated zinc such as zinc iodide or a zinc salt such as zinc sulfate or zinc acetate instead of zinc chloride.

In addition, the film may be hardened by producing a boric acid-potassium iodide aqueous solution to which zinc chloride has been added, and immersing the PVA film in the solution, and the method described in JP2007-086748A can be used.

(Stretching)

In the drawing step, the vertical uniaxial stretching method as described in the specification of U.S. Pat. No. 2,454,515A or the tenter method as described in JP2002-86554A can be preferably used. The stretching ratio is preferably in a range of twice to twelve times, and more preferably in a range of three times to ten times. In addition, it is also possible to preferably set the relationship between the stretching ratio, the original fabric thickness, and the polarizer thickness to satisfy (the polarizer film thickness after being adhered the protective film/the original fabric film thickness)×(the total stretching ratio)>0.17 which is described in JP2002-040256A or to set the relationship between the width of the polarizer when being taken out of the final bath and the width of the polarizer when the protective film is adhered to satisfy 0.80≤(the width of the polarizer when the protective film is adhered/the width of the polarizer when being taken out of the final bath)≤0.95 which is described in JP2002-040247A.

(Drying)

In the drying step, the well-known method of JP2002-86554A can be used, the temperature range is preferably in a range of 30° C. to 100° C., and the drying time is preferably in a range of 30 seconds to 60 minutes. In addition, it is also possible to preferably carry out a thermal treatment so that the underwater discoloration temperature is set to 50° C. or higher as described in JP3148513B or to preferably carrying out edging in an atmosphere in which the temperature and the humidity are managed as described in JP1995-325215A (JP-H07-325215) or JP1995-325218A (JP-H07-325218A).

(Coating-Type Polarizer)

The polarizer having a thin film thickness can be formed using a producing method in which the application method described in JP4691205B or JP4751481B is used.

The film thickness can be controlled using a well-known method, and, for example, the film thickness can be controlled by setting the die slit width or the stretching conditions in the flow casting step to appropriate values.

<Protective Film>

Next, the protective film (hereinafter, also referred to as "polarization plate protective film") used for the polarization plate of the present invention will be described.

The polarization plate of the present invention includes the first protective film, the polarizer, and the second protective film in this order.

The first protective film is a film including a (meth)acryl-based resin, has a thickness in a range of 20 μm to 30 μm, and an elastic modulus in a direction orthogonal to an absorption axis of the polarizer in a range of 3.0 GPa to 3.5 GPa.

The second protective film has a thickness that is 1.5 times to 1.8 times of the thickness of the first protective film, and has a humidity dimensional change ratio in the direction orthogonal to the absorption axis of the polarizer, which is expressed by the following expression (1), in a range of 0.45% to 0.8%, humidity dimensional change ratio (%)=[{(length at 25° C. and a relative humidity of 80%)−(length at 25° C. and a relative humidity of 10%)}/ (length at 25° C. and a relative humidity of 60%)]×100   Expression (1).

{First Protective Film (Inner Side Film)}

The first protective film is a film including a (meth)acryl-based resin (also referred to as "(meth)acryl-based resin film").

[(Meth)Acryl-Based Resin]

There is no particular limitation regarding the (meth) acryl-based resin, and an arbitrary appropriate (meth)acryl-based resin can be employed. Examples thereof include poly(meth)acrylic acid esters such as polymethylmethacrylate, methyl methacrylate-(meth)acrylic acid copolymers, methyl methacrylate-(meth)acrylic acid ester copolymers, methyl methacrylate-acrylic acid ester-(meth)acrylic acid copolymers, methyl (meth)acrylate-styrene copolymers (MS resins and the like), and polymers having an alicyclic hydrocarbon group (for example, methyl methacrylate-cyclohexyl methacrylate copolymers, methyl methacrylate-norbornene (meth)acrylate copolymers, and the like).

The (meth)acryl-based resin is preferably a poly(meth) acrylic acid ester such as polymethyl(meth)acrylate, and is more preferably polyalkyl (meth)acrylate C1-6 (a polymer of an alkyl ester of (meth)acrylic acid having 1 to 6 carbon atoms). A methylmethacrylic acid-based resin containing methyl methacrylate as a main component (50 mass % to 100 mass %, and preferably 70 mass % to 100 mass %) is still more preferred.

Specific examples of the (meth)acryl-based resin include ACRYPET VH™, ACRYPET VRL20A™ manufactured by Mitsubishi Rayon Co., Ltd., and (meth)acryl-based resins having a high glass transition temperature (Tg) which is obtained from an intermolecular crosslinking or intermolecular cyclization reaction.

In the invention, the (meth)acryl-based resin is preferably a (meth)acryl-based resin having a glutaric anhydride structure, a (meth)acryl-based resin having a lactone ring structure, or a (meth)acryl-based resin having a glutalimide structure since these resins have high thermal resistance, high transparency, and high mechanical strength.

Examples of the (meth)acryl-based resin having a glutaric anhydride structure include the (meth)acryl-based resins having a glutaric anhydride structure described in JP2006-283013A, JP2006-335902A, JP2006-274118A, and the like.

Examples of the (meth)acryl-based resin having a lactone ring structure include the (meth)acryl-based resin having a lactone ring structure described in JP2000-230016A, JP2001-151814A, JP2002-120326A, JP2002-254544A, JP2005-146084A, and the like.

Examples of the (meth)acryl-based resin having a glutalimide structure include the (meth)acryl-based resin having a glutalimide structure described in JP2006-309033A, JP2006-317560A, JP2006-328329A, JP2006-328334A, JP2006-337491A, JP2006-337492A, JP2006-337493A, JP2006-337569A, JP2007-009182A, and the like.

The Tg of the (meth)acryl-based resin is preferably 115° C. or higher, more preferably 120° C. or higher, still more preferably 125° C. or higher, and particularly preferably 130° C. or higher. When the (meth)acryl-based resin film includes a (meth)acryl-based resin having a Tg of 115° C. or higher as a main component, the (meth)acryl-based resin film is capable of obtaining excellent durability. The upper limit value of the Tg of the (meth)acryl-based resin is not particularly limited, but is preferably 170° C. or lower from the viewpoint of moldability and the like.

The content of the (meth)acryl-based resin in the first protective film is preferably in a range of 50 mass % to 100 mass %, more preferably in a range of 50 mass % to 99 mass %, still more preferably in a range of 60 mass % to 98 mass %, and particularly preferably in a range of 70 mass % to 97 mass %.

When the content of the (meth)acryl-based resin in the first protective film is 50 mass % or more, the original properties (high thermal resistance and high transparency) of the (meth)acryl-based resin are sufficiently exhibited, which is preferable.

The first protective film may include other thermoplastic resins in addition to the (meth)acryl-based resin, and examples of the other thermoplastic resins include olefin-based polymers such as polyethylene, polypropylene, ethylene-propylene copolymers, and poly(4-methyl-1-pentene); halogenated vinyl-based polymers such as vinyl chloride, vinylidene chloride, and chlorinated vinyl resins; acryl-based polymers such as methyl polymethacrylate; styrene-based polymers such as polystyrene, styrene-methyl methacrylate copolymers, styrene-acrylonitrile copolymers, and acrylonitrile-butadiene-styrene block copolymers; polyesters such as polyethylene terephthalate, polybutylene terephthalate, polyethylene naphthalate; polyamides such as nylon 6, nylon 66, and nylon 610; polyacetal; polycarbonate; polyphenylene oxide; polyphenylene sulfide; polyether ether ketone; polysulfone; polyether sulfone; polyoxybenzylene;

polyamide imide; rubber polymers such as ABS resins or acrylonitrile-styrene-acrylate (ASA) resins including polybutadiene-based rubber or acryl-based rubber; and the like.

The content ratio of the other thermoplastic resin in the first protective film is preferably in a range of 0 mass % to 50 mass %, more preferably in a range of 0 mass % to 40 mass %, still more preferably in a range of 0 mass % to 30 mass %, and particularly preferably in a range of 0 mass % to 20 mass %.

The first protective film may also include components other than what has been described above (additives). Examples of the additives include an antioxidant such as a hindered phenol-based antioxidant, a phosphorus-based antioxidant, or a sulfur-based antioxidant; a stabilizer such as a light-resistant stabilizer, a weather-resistant stabilizer, or a thermal resistant stabilizer; a reinforcing material such as a glass fiber or a carbon fiber; an ultraviolet absorber such as phenyl salicylate, (2,2'-hydroxy-5-methylphenyl)benzotriazole, or 2-hydroxybenzophenone; a near-infrared absorber; a flame retardant such as tris(dibromopropyl) phosphate, triallyl phosphate, or antimony oxide; an antistatic agent such as an anionic surfactant, a cationic surfactant, or a nonionic surfactant; a colorant such as an inorganic pigment, an organic pigment, or a dye; an organic filler or an inorganic filler; a resin reformer; an organic filler or an inorganic filler; a plasticizer; a lubricant; an antistatic agent; a flame retardant; a phase difference-reducing agent; and the like.

The content ratio of the additives in the first protective film is preferably in a range of 0 mass % to 5 mass %, more preferably in a range of 0 mass % to 2 mass %, and still more preferably in a range of 0 mass % to 0.5 mass %.

<Method for Producing First Protective Film>

There is no particular limitation regarding the method for producing the first protective film, and, for example, it is possible to obtain a thermoplastic resin composition by sufficiently mix the (meth)acryl-based resin and other polymers, additives, or the like using an arbitrary appropriate mixing method, in advance, and then mold the composition into a film. Alternately, it is also possible to obtain separate solutions of the (meth)acryl-based resin and other polymers, additives, or the like, mix the solutions so as to obtain a homogeneous mixed solution, and then mold the solution into a film.

To obtain the thermoplastic resin composition, the above-described film raw material is pre-blended using an arbitrary appropriate mixer, for example, an omni mixer, and then the obtained mixture is extruded and kneaded. In this case, there is no particular limitation regarding the mixer used for the extrusion and kneading, and, for example, an arbitrary approximate mixer such as an extruder including a single screw extruder or a twin screw extruder, or a pressurization kneader can be used.

Examples of the method for molding the film include arbitrary appropriate molding methods such as a solution casting method (solution flow casting method), a melt extrusion method, a calendaring method, and a compression molding method. Among the above-described film-molding methods, the solution casting method (the solution flow casting method) and the melt extrusion method are preferred.

Examples of a solvent used in the solution casting method (solution flow casting method) (hereinafter, also referred to as "solvent casting method") include aromatic hydrocarbons such as benzene, toluene, and xylene; aliphatic hydrocarbons such as cyclohexane and decalin; esters such as ethyl acetate and butyl acetate; ketones such as acetone, methyl ethyl ketone, and methyl isobutyl ketone; alcohols such as methanol, ethanol, isopropanol, butanol, isobutanol, methyl cellosolve, ethyl cellosolve, and butyl cellosolve; ethers such as tetrahydrofuran and dioxane; halogenated hydrocarbons such as dichloromethane, chloroform, and carbon tetrachloride; dimethyl formamide; dimethyl sulfoxide; and the like. These solvents may be singly used, or two or more solvents may be jointly used.

Examples of an apparatus for carrying out the solution casting method (solution flow casting method) include a drum-type casting machine, a band-type casting machine, a spin coater, and the like.

Examples of the melt extrusion method include a T die method, an inflation method, and the like. The molding temperature is preferably in a range of 150° C. to 350° C., and more preferably in a range of 200° C. to 300° C.

In a case in which the film is molded using the T die method, it is possible to obtain a roll-shaped film by attaching a T die to the front end portion of a well-known single screw or twin screw extruder, and winding a film extruded into a film shape. At this time, it is also possible to uniaxially draw the film by appropriately adjusting the temperature of a winding roll, and stretching the film in the extrusion direction. In addition, it is also possible to simultaneously or sequentially draw the film biaxially by stretching the film in the extrusion direction and the perpendicular direction to the extrusion direction.

The first protective film may be any of an unstretched film or a stretched film. In a case in which the first protective film is a stretched film, the first protective film may be any of a uniaxially stretched film or a biaxially stretched film. In a case in which the film is biaxially stretched, the mechanical strength improves, and the film performance improves. When the (meth)acryl-based resin film is mixed with another thermoplastic resin, it is possible to suppress an increase in the phase difference even after stretching, and hold optical isotropy.

The stretching temperature is preferably near the glass transition temperature of the thermoplastic resin composition which is a raw material of the film, and specifically, is preferably in a range of (glass transition temperature−30° C.) to (glass transition temperature+100° C.), and more preferably in a range of (glass transition temperature−20° C.) to (glass transition temperature+80° C.). From the viewpoint of obtaining a sufficient stretching ratio, the stretching temperature is preferably (glass transition temperature−30° C.) or higher. In addition, from the viewpoint of carrying out stable stretching without causing the flow of the resin composition, the stretching temperature is preferably (glass transition temperature+100° C.) or lower.

The stretching ratio that is defined as an area ratio is preferably in a range of 1.1 times to 25 times, and more preferably in a range of 1.3 times to 10 times. From the viewpoint of improving toughness from stretching, the stretching ratio is preferably 1.1 times or more. From the viewpoint of obtaining a sufficient stretching ratio, the stretching ratio is preferably 25 times or less.

The stretching rate is, in one direction, preferably in a range of 10%/min to 20,000%/min, and more preferably in a range of 100%/min to 10,000%/min. From the viewpoint of suppressing the time and the manufacturing costs to obtain a sufficient stretching ratio, the stretching rate is preferably 10%/min or more. In addition, from the viewpoint of suppressing the breakage or the like of the stretched film, the stretching rate is preferably 20,000%/min or less.

To stabilize the optical isotropy or the mechanical characteristics, it is possible to subject the first protective film to a thermal treatment (annealing) or the like after the stretching treatment. As the conditions of the thermal treatment, arbitrary appropriate conditions can be employed.

The thickness of the first protective film is in a range of 20 µm to 30 µm, preferably in a range of 22 µm to 28 µm, and more preferably in a range of 24 µm to 26 µm from the viewpoint of suppressing the generation of unevenness. When the thickness exceeds 30 µm, not only does the transparency degrade, but the moisture permeability also decreases, and in a case in which an aqueous adhesive is used, there is a concern that the drying rate of water, which is a solvent, may become slow. In addition, there is another concern that, when a durability test is carried out at a high temperature and a high humidity, light leakage may arise in the screen of the liquid crystal display. When the thickness is 20 µm or more, the strength improves, and when a durability test of the polarization plate is carried out, the polarization plate is not significantly crimped, which is preferable.

The thickness of the first protective film is the average film thickness measured through the optical microscope observation of a film cross-section.

The first protective film has a humidity dimensional change ratio in the direction (preferably the TD direction during the producing of the film) orthogonal to the absorption axis of the polarizer, which is expressed by the following expression (1), that is preferably 1.0% or less, more preferably 0.5% or less, and still more preferably in a range of 0.20% to 0.30% from the viewpoint of the stability of the optical characteristics, humidity dimensional change ratio (%)=[{(length at 25° C. and a relative humidity of 80%)−(length at 25° C. and a relative humidity of 10%)}/ (length at 25° C. and a relative humidity of 60%)]×100    Expression (1).

Similar to the humidity dimensional change ratio in the TD direction, the first protective film also has a humidity dimensional change ratio in a direction (preferably the film conveyance direction: MD direction during the producing of the film) in parallel with the absorption axis of the polarizer, which is expressed by the above-described expression (1), that is preferably 1.0% or less, more preferably 0.5% or less, and still more preferably 0.25% or less from the viewpoint of the stability of the optical characteristics. As the humidity dimensional change ratio of the first protective film decreases, the shrinkage or expansion of the first protective film arising from a temperature change decreases. Therefore, the force applied to an adhesive that is used to adhere the polarization plate to the liquid crystal cell or the glass configuring a liquid crystal cell is reduced, and consequently, the light leakage arising from photoelasticity is reduced.

From the viewpoint of the conveyance property of the film when the film is formed or the polarization plate is produced, the elastic modulus of the first protective film in the direction (preferably the TD direction during the producing of the film) orthogonal to the absorption axis of the polarizer is in a range of 3.0 GPa to 3.5 GPa, preferably in a range of 3.1 GPa to 3.5 GPa, and more preferably in a range of 3.1 GPa to 3.3 GPa. When the elastic modulus is too high, the film is brittle, and is easily cracked. When the elastic modulus is too low, the stiffness (self-supporting property) of the film during conveyance is lost when the film is formed or the polarization plate is produced, and the film is easily wrinkled.

The wetting tension at the surface of the first protective film is preferably 40 mN/m or more, more preferably 50 mN/m or more, and still more preferably 55 mN/m or more. When the wetting tension at the surface is at least 40 mN/m or more, the adhesive strength between the (meth)acryl-based resin film and the polarizer further improves. To adjust the wetting tension at the surface, it is possible to carry out an arbitrary appropriate surface treatment. Examples of the surface treatment include a corona discharge treatment, a plasma treatment, ozone blowing, ultraviolet radiation, a flame treatment, and a chemical agent treatment. Among the above-described treatments, the corona discharge treatment and the plasma treatment are preferred.

The first protective film is preferably disposed on a side of the liquid crystal cell (inner side) when the polarization plate of the present invention is assembled into a liquid crystal display.

The first protective film is preferably used as the inner side film since the occurrence of unevenness is suppressed in a case in which the first protective film is used for a long period of time at a high temperature and a high humidity.

{Second Protective Film (Outer Side Film)}

The thickness of the second protective film is in a range of 1.5 times to 1.8 times of the thickness of the first protective film, and the humidity dimensional change ratio in the direction orthogonal to the absorption axis of the polarizer, which is expressed by the following expression (1), is in a range of 0.45% to 0.8%, humidity dimensional change ratio (%)=[{(length at 25° C. and a relative humidity of 80%)−(length at 25° C. and a relative humidity of 10%)}/ (length at 25° C. and a relative humidity of 60%)]×100    Expression (1).

When the second protective film is provided with a thickness and a humidity dimensional change ratio in the direction orthogonal to the absorption axis of the polarizer within the specific ranges as described above, it is possible to produce the polarization plate that is excellent in terms of the producing suitability of the liquid crystal display from the viewpoint of curling.

There is no particular limitation regarding the material configuring the second protective film.

The second protective film preferably includes a resin, and a well-known resin can be used as the resin. The resin is not particularly limited within the scope of the purpose of the present invention, and examples thereof include cellulose acylate, (meth)acryl-based resins, cycloolefin-based resins, and polyester-based resins, but cellulose acylate is preferred.

(Cellulose Acylate)

Hereinafter, cellulose acylate which can be used for the second protective film will be described in detail.

The degree of substitution of cellulose acylate refers to the ratio of acylated hydroxyl groups to three hydroxyl groups present in the constitution unit ((β-)1,4-glycoside-bonded glucose) of cellulose. The degree of substitution (degree of acylation) can be computed by measuring the amount of bonded fatty acid per constitution unit mass of cellulose. In the present invention, the degree of substitution of a cellulose body can be computed from the peak intensity ratio of carbonyl carbon in an acyl group by dissolving the cellulose body in a solvent such as deuterium-substituted dimethyl sulfoxide, and measuring a $^{13}$C-NMR spectrum. In addition, the degree of substitution can be obtained by substituting the residual hydroxyl group of cellulose acylate by other acyl group that is different from the acyl group originally included in cellulose acylate, and measuring a $^{13}$C-NMR. The detail of the measurement method is described in Tezuka et al. (Carbohydrate. Res., 273 (1995) 83 to 91).

The total degree of acyl substitution of the cellulose acylate is preferably in a range of 2.0 to 2.97, more preferably in a range of 2.2 to 2.95, and particularly preferably in a range of 2.3 to 2.95.

The acyl group in the cellulose acylate is particularly preferably an acetyl group, a propionyl group, or a butyryl group, and is more particularly preferably an acetyl group. A mixed fatty acid ester made of two or more kinds of acyl groups can also be preferably used as the cellulose acylate in the invention. In this case as well, the acyl group is preferably an acetyl group and an acyl group having 3 to 4 carbon atoms. In a case in which the mixed fatty acid ester is used, the degree of substitution of the acetyl group is preferably less than 2.5, and more preferably less than 1.9. Meanwhile, the degree of substitution of the acyl group having 3 to 4 carbon atoms is preferably in a range of 0.1 to 1.5, more preferably in a range of 0.2 to 1.2, and particularly preferably in a range of 0.5 to 1.1.

The second protective film in the present invention may be formed by jointly using or mixing two kinds of cellulose acylates having different substituents and/or degrees of substitution, and may be a film having multiple layers made of different cellulose acylates produced using a co-flow casting method described below.

Furthermore, a mixed acid ester having the fatty acid acyl group described in 0023 to 0038 of JP2008-20896A and a substituted or unsubstituted aromatic acyl group can also be preferably used in the present invention.

The cellulose acylate preferably has a mass-average polymerization degree in a range of 250 to 800, and more preferably has a mass-average polymerization degree in a range of 300 to 600.

In addition, the cellulose acylate preferably has a number-average molecular weight in a range of 70000 to 230000, more preferably has a number-average molecular weight in a range of 75000 to 230000, and most preferably has a number-average molecular weight in a range of 78000 to 120000.

The cellulose acylate can be synthesized using an acid anhydride or an acid chloride as an acylation agent. In a case in which the acylation agent is an acid anhydride, an organic acid (for example, acetic acid) or methylene chloride is used as a reaction solvent. In addition, a protonic catalyst such as sulfuric acid can be used as a catalyst. In a case in which the acylation agent is an acid chloride, a basic compound can be used as the catalyst. In a synthesis method that is most ordinary in an industrial sense, the cellulose ester is synthesized by esterification using a mixed organic acid component containing an organic acid (acetic acid, propionic acid, or butyric acid) or an acid anhydride thereof (acetic acid anhydride, propionic acid anhydride, or butyric anhydride) corresponding to the acetyl group and the other acyl group.

In the above-described method, cellulose such as a cotton linter or wood pulp is, in many cases, activated using an organic acid such as acetic acid, and then is esterified in the presence of a sulfuric acid catalyst using a liquid mixture of the above-described organic acid component. It is common to use an excessive amount of the organic acid anhydride component compared with the amount of a hydroxyl group present in cellulose. In the esterification treatment, a hydrolysis reaction (depolymerization reaction) of a cellulose main chain (($\beta$-)1,4-glycoside-bond) as well as the esterification reaction occurs. As the hydrolysis reaction of the main chain proceeds, the polymerization degree of the cellulose ester decreases, and the properties of a cellulose ester film being produced degrade. Therefore, the reaction conditions such as a reaction temperature are preferably determined in consideration of the polymerization degree or molecular weight of a cellulose ester being obtained.

(Additives)

The second protective film may include the organic acid or well-known additives that are used for other polarization plate protective films within the purpose of the present invention. The inclusion of the organic acid and well-known additives can assist the control of the humidity dimensional change ratio. There is no particular limitation regarding the molecular weight of the additives included in the second protective film, and additives described below can be preferably used.

In addition to the control of the humidity dimensional changer rate, the addition of the additives exhibits a useful effect from the viewpoint of reforming the film such as improving the thermal, optical, and mechanical properties of the film, imparting flexibility and water-absorbing resistance, and reducing the moisture transmittance.

Examples of the control of the mechanical properties include the addition of a plasticizer to the film, and as an example of the plasticizer that serves as a reference, it is possible to reference a variety of well-known ester-based plasticizers such as phosphoric acid ester, citric acid ester, trimellitic acid ester, and sugar ester or the polyester-based polymers described in 0042 to 0068 of WO2011/102492A.

In addition, regarding the control of the optical properties, the description of 0069 to 0072 of WO2011/102492A can be referenced for the imparting of the ultraviolet ray or infrared ray-absorbing capability, and a well-known retardation adjuster can be used to adjust the phase difference of the film or control the development property. Then, it is possible to assist the control of the humidity dimensional change ratio.

(Thickness)

The thickness of the second protective film is preferably in a range of 30 μm to 54 μm, more preferably in a range of 33 μm to 50 μm, and particularly preferably in a range of 36 μm to 47 μm. The thickness is preferably 54 μm or less from the viewpoint of curling. Meanwhile, when the thickness is 30 μm or more, the film is not easily broken during conveyance when the polarization plate is processed, and the surface of the polarization plate is not easily scratched.

The thickness of the second protective film is the average film thickness measured through the optical microscope observation of a film cross-section.

The amount of the additives added is preferably 10 mass % or more, more preferably 15 mass % or more, and still more preferably 20 mass % or more with respect to the cellulose acylate from the viewpoint of developing a variety of the above-described effects. The upper limit is preferably 80 mass % or less, and more preferably 65 mass % or less. In a case in which two or more additives are used, the total amount thereof is preferably within the above-described range.

(Water Vapor Transmission Rate)

The water vapor transmission rate of the second protective film is preferably 10 g/m$^2$/day or more from the viewpoint of the drying rate during the producing of the polarization plate. The water vapor transmission rate of the second protective film is more preferably in a range of 10 g/m$^2$/day to 500 g/m$^2$/day, still more preferably in a range of 100 g/m$^2$/day to 500 g/m$^2$/day, and particularly preferably in a range of 200 g/m$^2$/day to 450 g/m$^2$/day.

In the present specification, the value of the water vapor transmission rate is a value obtained by measuring the weight (g) of water vapor passing through a specimen having an area of one square meter for 24 hours in an atmosphere having a temperature of 40° C. and a relative humidity of 92% according to the water vapor transmission test (cup method) of JIS Z0208.

<Method for Producing Second Protective Film>

The method for producing the second protective film is not particularly limited as long as the film is produced using the (meth)acryl-based resin, a cycloolefin-based resin, and a polyester-based resin. For example, it is possible to obtain a thermoplastic resin composition by sufficiently mix the resin, other polymers, the additive, and the like using an arbitrary appropriate mixing method, in advance, and then mold the thermoplastic resin composition into a film. Alternatively, it is also possible to obtain separate solutions of the resin, other polymers, the additive, and the like, then, mix the solutions so as to obtain a homogeneous liquid mixture, and then mold a film.

To obtain the above-described thermoplastic resin composition, the above-described film raw material is pre-blended using an arbitrary appropriate mixer, for example, an omni mixer, and then the obtained mixture is extruded and kneaded. In this case, there is no particular limitation regarding the mixer used for the extrusion and kneading, and, for example, an arbitrary approximate mixer such as an extruder including a single screw extruder or a twin screw extruder, or a pressurization kneader can be used.

Examples of the method for molding the film include arbitrary appropriate molding methods such as a solution casting method (solution flow casting method), a melt extrusion method, a calendaring method, and a compression molding method. Among the above-described film-molding methods, the solution casting method (the solution flow casting method) and the melt extrusion method are preferred.

Regarding the method for producing the second protective film, a case in which the second protective film is a film including the cellulose acylate (also referred to as "cellulose acylate film") will be described in detail as an example.

The cellulose acylate film can be produced using the solvent casting method. Hereinafter, regarding the method for producing the second protective film, an aspect in which the cellulose acylate is used as the base material will be described as an example, but the second protective film can be similarly produced using other resins. In the solvent casting method, the film is produced using a solution (hereinafter, also referred to as "cellulose acylate solution" or "dope") obtained by dissolving the cellulose acylate in the organic solvent.

The organic solvent preferably includes a solvent selected from ethers having 3 to 12 carbon atoms, ketones having 3 to 12 carbon atoms, esters having 3 to 12 carbon atoms, and halogenated hydrocarbons having 1 to 6 carbon atoms.

The ethers, the ketones, and the esters may have a cyclic structure. In addition, a compound having two or more functional groups (any of the functional groups of ethers, ketones, and esters, that is, —O—, —CO—, and —COO—) can be used as the organic solvent. The organic solvent may have other functional groups such as an alcoholic hydroxyl group. In the case of an organic solvent having two or more kinds of functional groups, the number of carbon atoms is preferably within the above-described preferable range of carbon atoms in the solvent having any of the above-described functional groups.

Examples of the ethers having 3 to 12 carbon atoms include diisopropyl ether, dimethoxy methane, dimethoxy ethane, 1,4-dioxane, 1,3-dioxazolane, tetrahydrofuran, anisole, and phenetole.

Examples of the ketones having 3 to 12 carbon atoms include acetone, methyl ethyl ketone, diethyl ketone, diisobutyl ketone, cyclohexanone, and methyl cyclohexanone.

Examples of the esters having 3 to 12 carbon atoms include ethyl formate, propyl formate, bentyl formate, methyl acetate, ethyl acetate, and pentyl acetate.

In addition, examples of the organic solvent having two or more kinds of functional groups include 2-ethoxy ethyl acetate, 2-methoxy ethanol, and 2-buthoxy ethanol.

The number of carbon atoms in the halogenated hydrocarbon having 1 to 6 carbon atoms is preferably one or two, and most preferably one. The halogen in the halogenated hydrocarbon is preferably chlorine. The ratio of hydrogen atoms in the halogenated hydrocarbon substituted by the halogen is preferably in a range of 25 mol % to 75 mol %, more preferably in a range of 30 mol % to 70 mol %, still more preferably in a range of 35 mol % to 65 mol %, and most preferably in a range of 40 mol % to 60 mol %. Methylene chloride is a typical halogenated hydrocarbon.

In addition, two or more kinds of organic solvents may be used in a mixture form.

The cellulose acylate solution (dope) can be prepared using an ordinary method including a treatment at a temperature of 0° C. or higher (room temperature or a high temperature). The cellulose acylate solution can be prepared using a method and an apparatus for preparing the dope in an ordinary solvent casting method. Meanwhile, in the case of an ordinary method, the halogenated hydrocarbon (particularly, methylene chloride) is preferably used as the organic solvent.

The amount of the cellulose acylate in the cellulose acylate solution is adjusted so that the cellulose acylate is included in the solution being obtained in a range of 10 mass % to 40 mass %. The amount of the cellulose acylate is more preferably in a range of 10 mass % to 30 mass %, and other arbitrary additives described below may be added to the organic solvent (main solvent).

The cellulose acylate solution can be prepared by stirring the cellulose acylate and the organic solvent at room temperature (0° C. to 40° C.). A high-concentration solution may be prepared through stirring under pressurization and heating conditions. Specifically, the cellulose acylate and the organic solvent are put into a pressurization container, are sealed, and are stirred under heating to a temperature that is the boiling point or higher of the solvent at room temperature under pressurization and is in a range in which the solvent is not boiled. The heating temperature is generally 40° C. or higher, preferably in a range of 60° C. to 200° C., and more preferably in a range of 80° C. to 110° C.

The respective components may be coarsely mixed in advance, and then be put into the container. In addition, the components may be sequentially injected into the container. The container needs to be configured so that the components can be stirred. It is possible to infuse an inert gas such as nitrogen gas and pressurize the container. In addition, an increase of vapor pressure of the solvent through heating may be used. Alternately, after the container is sealed, the respective components may be added under pressure.

In a case in which the container is heated, it is preferable to heat the container from the outside. For example, a jacket-type heating apparatus can be used. In addition, it is also possible to heat the entire container by providing a plate heater at the outside of the container, and circulating a liquid through a pipe.

The components are preferably stirred using stirring blades that are provided inside the container. The stirring blades preferably have enough of a length so as to reach the vicinity of the container wall. A scraping blade is preferably provided at the end of the stirring blade to renew a liquid film on the container wall.

Gauges such as a pressure meter and a thermometer may be installed in the container. The respective components are dissolved in the solvent in the container. The prepared dope is cooled and removed from the container, or is removed and then cooled using a heat exchanger or the like.

It is also possible to prepare the cellulose acylate solution using a cooling and dissolving method. Regarding the detail of the cooling and dissolving method, the technique described in 0115 to 0122 of JP2007-86748A can be used.

The cellulose acylate film is produced from the prepared cellulose acylate solution (dope) using the solvent casting method. A retardation developer is preferably added to the dope. The dope is flow-cast on a drum or a band, and a film is formed by evaporating the solvent. The concentration of the dope before the flow casting is preferably adjusted so that the amount of the solid content is in a range of 18% to 35%. The surface of the drum or the band is preferably prepared in a mirror-like state. The dope is preferably flow-cast on the drum or the band having a surface temperature of 10° C. or lower.

Regarding the drying method in the solvent casting method, there are descriptions in individual specifications of U.S. Pat. No. 2,336,310A, U.S. Pat. No. 2,367,603A, U.S. Pat. No. 2,492,078A, U.S. Pat. No. 2,492,977A, U.S. Pat. No. 2,492,978A, U.S. Pat. No. 2,607,704A, U.S. Pat. No. 2,739,069A, and U.S. Pat. No. 2,739,070A, individual specifications of GB640731A and GB736892A, JP1970-4554B (JP-S45-4554B), JP1974-5614B (JP-S49-5614B), JP1985-176834A (JP-S60-176834A), JP1985-203430A (JP-S60-203430A), and JP1987-115035A (JP-S62-115035A). The solution can be dried on the band or the drum by blowing an inert gas such as air or nitrogen.

In addition, it is also possible to evaporate the residual solvent by stripping the obtained film from the drum or the band, and drying the film using high-temperature wind having a temperature that has been sequentially changed in a range of 100° C. to 160° C. The above-described method is described in JP1993-17844B (JP-H5-17844B). According to this method, it is possible to shorten the time from the flow casting to the stripping. To carry out the invention, the gelation of the dope at the surface temperature of the drum or the band during the flow casting is required.

It is also possible to flow-cast the prepared cellulose acylate solution (dope) in two or more layers, thereby producing films. In this case, the cellulose acylate film is preferably produced using the solvent casting method. The film is formed by flow-casting the dope on the drum or the band, and evaporating the solvent. The concentration of the dope before the flow casting is preferably adjusted so that the amount of the solid content is in a range of 10 mass % to 40 mass %. The surface of the drum or the band is preferably in a mirror-like state at the end.

In a case in which multiple cellulose acylate solutions are flow-cast in two or more layers, multiple cellulose acylate solutions can be caused to flow, and it is also possible to produce a film while a solution including the cellulose acylate is flow-cast from multiple flow casting openings provided at intervals in a support advancing direction, and is laminated. In this case, the methods described in, for example, JP1986-158414A (JP-S61-158414A), JP1989-122419A (JP-H1-122419A), and JP1999-198285A (JP-H11-198285A) can be used. In addition, it is also possible to produce a film by flow-casting the cellulose acylate solution from two flow casting openings. In this case, the methods described in, for example, JP1985-27562B (JP-S60-27562B), JP1986-94724A (JP-S61-94724A), JP1986-947245A (JP-S61-947245A), JP1986-104813A (JP-S61-104813A), JP1986-158413A (JP-S61-158413A) and JP1994-134933A (JP-H6-134933A) can be used. Furthermore, it is also possible to use a flow casting method of a cellulose acylate film in which the flow of a high-viscosity cellulose acylate solution described in JP1981-162617A (JP-S56-162617A) is encapsulated using a low-viscosity cellulose acylate solution, and the high and low-viscosity cellulose acylate solutions are extracted at the same time.

In addition, it is also possible to produce a film by using two flow casting openings, stripping a film formed on a support from a first flow casting opening, and carrying out second flow casting on a side that is in contact with the support surface. Examples of this method include the method described in JP1969-20235B (JP-S44-20235B).

As the cellulose acylate solutions to be flow-cast, the same solution may be used, or two or more different cellulose solutions may be used. To provide multiple functions to multiple cellulose acylate layers, it is necessary to extrude cellulose acylate solutions having corresponding functions from individual flow casting openings. Furthermore, it is also possible to flow-cast the cellulose acylate solution in the present invention together with cellulose acylate solutions for other functional layers (for example, an adhesive layer, a dyeing layer, an antistatic layer, an anti-variation layer, an ultraviolet-absorbing layer, a polarization layer, and the like) at the same time.

(Addition of Organic Acid)

In a case in which the organic acid is added to the cellulose acylate solution, the addition timing is not particularly limited as long as the organic acid is added when the film is produced. For example, the organic acid may be added when the cellulose acylate is synthesized, and the organic acid may be mixed with the cellulose acylate when the dope is prepared.

(Addition of Other Additives)

Deterioration inhibitors (for example, an antioxidant, a peroxide decomposer, a radical inhibitor, a metal deactivator, an acid-trapping agent, an amine, and the like) may be added to the second protective film. The deterioration inhibitors are described in JP1991-199201A (JP-H3-199201A), JP1993-1907073A (JP-H5-1907073A), JP1993-194789A (JP-H5-194789A), JP1993-271471A (JP-H5-271471A), and JP1994-107854A (JP-H6-107854A). In addition, the amount of the deterioration inhibitors added is preferably in a range of 0.01 mass % to 1 mass %, and more preferably in a range of 0.01 mass % to 0.2 mass % of the solution being prepared (dope). When the amount of the deterioration inhibitor added is 0.01 mass % or more, the effect of the deterioration inhibitors is sufficiently exhibited, which is preferable. When the amount of the deterioration inhibitor added is 1 mass % or less, the deterioration inhibitors do not easily breed out on the film surface, which is preferable. Particularly preferable deterioration inhibitors include butylated hydroxytoluene (BHT), tribenzylamine (TBA), and the like.

In addition, it is preferable to add fine particles to the second protective film as a matting agent. Examples of the fine particles include silicon dioxide, titanium dioxide, aluminum oxide, zirconium oxide, calcium carbonate, talc, clay, fired kaolin, fired calcium silicate, hydrated calcium siliate, aluminum silicate, magnesium silicate, and calcium phosphate. Fine particles containing silicon are preferred since the turbidity decreases, and silicon dioxide is particularly preferred. Silicon dioxide fine particles preferably have an average primary particle diameter of 20 nm or less, and have an apparent specific gravity of 70 g/liter or more. The apparent specific gravity is preferably in a range of 90 g/liter to 200 g/liter, and more preferably in a range of 100 g/liter to 200 g/liter. The apparent specific gravity is preferably higher since it becomes possible to produce a higher-concentration dispersion fluid, and the haze and an aggregate becomes more favorable.

Generally, these fine particles form secondary particles having an average particle diameter in a range of 0.1 µm to 3.0 µm, are present in the film in a form of an aggregate of the primary particles, and form 0.1 µm to 3.0 µm protrusions and recesses on the film surface. The average secondary particle diameter is preferably in a range of 0.2 µm to 1.5 µm, more preferably in a range of 0.4 µm to 1.2 µm, and most preferably in a range of 0.6 µm to 1.1 µm. The primary particle diameter and the secondary particle diameter were obtained by observing particles in the film using a scanning electron microscope, and measuring the diameters of the circumscribed circles of the particles as the particle diameters. In addition, 200 particles were observed at a different position, and the average value thereof was obtained as the average particle diameter.

As the silicon dioxide fine particles, for example, commercially available products such as AEROSIL R972™, R972V™, R974™, R812™, 200™, 200V™, 300™, R202™, OX50™, TT600™ (all manufactured by Evonik Degussa), and the like can be used. Zirconium oxide fine particles have been put into commercial use under the product name of AEROSIL R976™ and R811™ (all manufactured by Evonik Degussa), and can be used.

Among the above-described fine particles, AEROSIL 200V and AEROSIL R972V are particularly preferred since these fine particles are silicon dioxide fine particles having an average primary particle diameter of 20 nm or less and an apparent specific gravity of 70 g/liter or more, and has a strong effect that reduces the friction coefficient while maintaining the turbidity of an optical film at a low level.

To obtain a polarization plate protective film including particles with a small average secondary particle diameter, several methods for preparing a dispersion fluid of the fine particles can be considered. For example, there is a method in which a fine particle dispersion fluid in which a solvent and fine particles have been stirred and mixed together in advance is prepared, the fine particle dispersion fluid is added to a small amount of a separately-prepared cellulose acylate solution, and is dissolved through stirring, and furthermore, the solution is mixed with a main cellulose acylate solution (dope solution). This method is a preferable preparation method since the dispersion property of silicon dioxide fine particles is favorable, and the additional re-aggregation of the silicon dioxide fine particles is not easily allowed. Furthermore, there is another method in which a small amount of the cellulose ester is added to a solvent, is dissolved through stirring, then, fine particles are added to the solution, are dispersed using a disperser so as to produce a fine particle-added solution, and the fine particle-added solution is sufficiently mixed with the dope solution using an inline mixer. The present invention is not limited to this method, and the concentration of the silicon dioxide when the silicon dioxide fine particles are mixed and dispersed in a solvent or the like is preferably in a range of 5 mass % to 30 mass %, more preferably in a range of 10 mass % to 25 mass %, and most preferably in a range of 15 mass % to 20 mass %. The dispersion concentration is preferably higher since the degree of turbidity becomes low in relation to the amount of the fine particles added, and the haze and an aggregate become more favorable. The amount of matting agent fine particles added to the dope solution of the final cellulose acylate is preferably in a range of 0.01 g to 1.0 g, more preferably in a range of 0.03 g to 0.3 g, and most preferably in a range of 0.08 g to 0.16 g per cubic meter.

Preferable examples of lower alcohols as the solvent being used include methyl alcohol, ethyl alcohol, propyl alcohol, isopropyl alcohol, butyl alcohol, and the like. There is no particular limitation regarding solvents other than the lower alcohols, and the solvent used during the formation of the cellulose ester film is preferably used.

The steps from the flow casting to the later drying may be carried out in an air atmosphere or in an atmosphere of an inert gas such as nitrogen gas. An ordinarily-used winder may be used as the winder used to produce the polarization plate protective film in the present invention, and the protective film can be wound using a winding method such as a positive tension method, a positive torque method, a taper tension method, or a program tension control method having a constant inner stress.

(Stretching Treatment)

It is also possible to carry out a stretching treatment on the second protective film. The stretching treatment enables the imparting of a desired retardation to the polarization plate protective film. Any of the width direction (hereinafter, also referred to as "widthwise direction") and the lengthwise direction is preferred as the stretching direction of the cellulose acylate film.

The method for stretching the second protective film in the width direction is described in, for example, JP1987-115035A (JP-S62-115035A), JP1992-152125A (JP-H4-152125A), JP1992-284211A (JP-H4-284211A), JP1992-298310A (JP-H4-298310A), JP 1999-48271A (JP-H11-48271A), and the like.

The second protective film is preferably stretched under heating conditions. The film can be stretched through a treatment during drying, which is effective particularly in a case in which the solvent remains. In the case of stretching in the lengthwise direction, for example, when the winding rate of the film is set to be faster than the stripping rate of the film by adjusting the speed of the conveyance roller of the film, the film is stretched. In the case of stretching in the width direction, the film can be stretched by conveying the film with the width of the film held using a tenter, and gradually increasing the width of the tenter. It is also possible to draw the film using a drawer (preferably uniaxial stretching using a long drawer) after the drying of the film.

The second protective film is preferably stretched, using the glass transition temperature Tg of the film, at a temperature in a range of (Tg−5° C.) to (Tg+40° C.), more preferably stretched at a temperature in a range of Tg to (Tg+35° C.), and particularly preferably stretched at a temperature in a range of (Tg+10° C.) to (Tg+30° C.) In a case that the second protective film is dried film, the second protective film is preferably stretched at a temperature in a range of 130° C. to 200° C.

In addition, in a case in which the second protective film is stretched in a state in which the dope solvent remains after the flow casting, it becomes possible to draw the second protective film at a temperature lower than the temperature of dried film, and in this case, the temperature is preferably in a range of 100° C. to 170° C.

The stretching ratio (the extension ratio to the unstretched film) of the second protective film is preferably in a range of 1% to 200%, and more preferably in a range of 5% to 150%. Particularly, the stretching ratio of the second protective film in the width direction is preferably in a range of 1% to 200%, more preferably in a range of 5% to 150%, and particularly preferably in a range of 30% to 45%.

The stretching rate is preferably in a range of 1%/minute to 300%/minute, more preferably in a range of 10%/minute to 300%/minute, and most preferably in a range of 30%/minute to 300%/minute.

In addition, the second protective film is preferably produced through a step in which the second protective film is stretched to the maximum stretching ratio, and then is held for a certain period of time at a stretching ratio lower than the maximum stretching ratio (hereinafter, in some cases, referred to as "alleviation step"). The stretching ratio in the alleviation step is preferably in a range of 50% to 99% of the maximum stretching ratio, more preferably in a range of 70% to 97% of the maximum stretching ratio, and most preferably in a range of 90% to 95% of the maximum stretching ratio. In addition, the time of the alleviation step is preferably in a range of 1 second to 120 seconds, and more preferably in a range of 5 seconds to 100 seconds.

Furthermore, the polarization plate protective film can be preferably produced by including a shrinkage step in which the film is shrunk while being gripped in the width direction.

In a producing method including the stretching step in which the film is stretched in the width direction and the shrinkage step in which the film is shrunk in the conveyance direction (lengthwise direction), the film can be shrunk by holding the film using a pantagraph-type or linear motor-type tenter, and gradually narrowing the intervals between clips in the conveyance direction while stretching the film in the width direction.

In the above-described method, it is possible to carry out at least a part of the stretching step and the shrinkage step at the same time.

Meanwhile, as the stretching apparatus that specifically carries out a step in which the film is stretched in any one of the lengthwise direction and the width direction, simultaneously, is shrunk in the other direction, thereby increasing the film thickness of the film (in other words, a stretching and shrinkage step), a FITZ machine manufactured by Ichikin Co., Ltd. or the like can be desirably used. This machine is described in (JP2001-38802A).

Regarding the stretching ratio in the stretching step and the shrinkage ratio in the shrinkage step, arbitrary appropriate values can be selected from the intended values of the in-plane retardation (Re) and the thicknesswise retardation (Rth), and the stretching ratio in the stretching step is preferably 10% or more, and the shrinkage ratio in the shrinkage step is preferably 5% or more.

Particularly, it is preferable to include the stretching step in which the film is stretched in the width direction at a stretching ratio of 10% or more and the shrinkage step in which the film is shrunk in the conveyance direction at a shrinkage ratio of 5% or more while the film is gripped in the width direction.

Meanwhile, the shrinkage ratio mentioned in the present invention refers to the ratio of the shrunk length of the shrunk film in the shrinkage direction to the length of the non-shrunk film.

The shrinkage ratio is preferably in a range of 5% to 40%, and particularly preferably in a range of 10% to 30%.

The second protective film has a humidity dimensional change ratio in the direction (preferably the TD direction during the producing of the film) orthogonal to the absorption axis of the polarizer, which is expressed by the above-described expression (1), that is in a range of 0.45% to 0.8%, and from the viewpoint of a more preferably curling amount, preferably in a range of 0.50% to 0.80%, more preferably in a range of 0.55% to 0.75%, and most preferably in a range of 0.55% to less than 0.65%.

As the method for setting the humidity dimensional change ratio of the second protective film in the direction orthogonal to the absorption axis of the polarizer, which is expressed by the above-described expression (1) in a range of 0.45% to 0.8%, a method in which, when peeled off, the film is strongly stretched in the conveyance direction (lengthwise direction) can be used. Then, a film in which macromolecules are oriented in the conveyance direction can be produced, and consequently, the humidity dimensional change ratio in the TD direction increases, and the humidity dimensional change ratio in the MD direction decreases. In addition, the elastic modulus in the TD direction decreases, and the elastic modulus in the MD direction increases. In addition, as another method, there is a method in which the dimensional change is adjusted by changing the kind or amount of the additives to the film. To increase the humidity dimensional change in the TD direction, it is preferable to select the additives so that the water-absorbing property of the film improves.

The second protective film has a humidity dimensional change ratio in the direction (preferably the conveyance direction of the film during the producing of the film: MD direction) in parallel with the absorption axis of the polarizer, which is expressed by the above-described expression (1), that is preferably in a range of 0.1% to 0.35%, and more preferably in a range of 0.15% to 0.25% from the viewpoint of reducing curling in the conveyance direction.

From the viewpoint of the balance between curling in the conveyance direction and curling in the direction orthogonal to the conveyance direction, the value of the second protective film obtained by subtracting the humidity dimensional change ratio in the direction (preferably the TD direction during the producing of the film) orthogonal to the absorption axis of the polarizer, which is expressed by the above-described expression (1) from the humidity dimensional change ratio in the direction (preferably the MD direction during the producing of the film) in parallel with the absorption axis of the polarizer, which is expressed by the above-described expression (1) is preferably in a range of −0.15% to −0.4%, more preferably in a range of −0.25% to −0.4%, and still more preferably in a range of −0.3% to −0.4%.

From the viewpoint of more effectively improving the curling, the elastic modulus of the second protective film in the direction (preferably the TD direction during the producing of the film) orthogonal to the absorption axis of the polarizer is preferably 4.2 GPa or less, more preferably in a range of 2.0 GPa to 3.8 GPa, particularly preferably in a range of 2.5 GPa to 3.5 GPa, and most preferably in a range of 2.8 GPa to less than 3.3 GPa. In addition, the elastic modulus of the second protective film in the direction (preferably the MD direction during the producing of the film) in parallel with the absorption axis of the polarizer is preferably 4.2 GPa or more, more preferably in a range of 4.7 GPa to 6.2 GPa, and most preferably in a range of 5.2 GPa to 5.7 GPa.

The second protective film is preferably disposed on an outer side (the opposite side of the side of the liquid crystal cell) when the polarization plate of the present invention is assembled into a liquid crystal display.

The second protective film is preferably used as the outer side film since the surface of the liquid crystal display is not easily scratched.

[Method for Producing Polarization Plate]

Hereinafter, the method for producing the polarization plate of the present invention will be described in the order of a method for laminating the first protective film, the second protective film (hereinafter, these protective films will be also referred to as "polarization plate protective films"), and the polarizer, and the functionalization of the polarization plate.

(Saponification Treatment)

When an alkali saponification treatment is carried out on the polarization plate protective films (the first protective film and the second protective film), the adhesiveness to the material of the polarizer such as polyvinyl alcohol is supplied, and the film can be used as the polarization plate protective film.

As the saponification method, the method described in 0211 and 0212 of JP2007-86748A can be used.

For example, the alkali saponification treatment on the polarization plate protective films is preferably carried out in a cycle in which the film surface is immersed in an alkali solution, then, is neutralized using an acidic solution, is washed using water, and is dried. Examples of the alkali solution include a potassium hydroxide solution and a sodium hydroxide solution. The concentration of a hydroxylated ion is preferably in a range of 0.1 mol/L to 5.0 mol/L, and more preferably in a range of 0.5 mol/L to 4.0 mol/L. The temperature of the alkali solution is preferably in a range of room temperature (20° C.) to 90° C., and more preferably in a range of 40° C. to 70° C.

Instead of the alkali saponification treatment, an easy adhesion process as described in JP1994-94915A (JP-H6-94915A) and JP1994-118232A (JP-H6-118232A) may be carried out.

<Method for Laminating Polarizer and Polarization Plate Protective Film>

The method for producing the polarization plate of the present invention preferably includes a step in which two polarization plate protective films are laminated on both surfaces of the polarizer of the present invention obtained above.

In the method for producing the polarization plate of the present invention, the polarization plate is preferably produced using a method in which the polarization plate protective films are alkali-treated, and are attached to both surfaces of the polarizer using an adhesive.

Examples of the adhesive used to attach the treated surfaces of the polarization plate protective films and the polarizer include polyvinyl alcohol-based adhesives such as polyvinyl alcohol and polyvinyl butyral, vinyl-based latexes such as butyl acrylate, and the like.

In the polarization plate of the present invention, the polarization plate protective films and the polarizer are preferably laminated so that the absorption axis of the polarizer and the direction (TD direction) orthogonal to the film conveyance direction during the producing of the polarization plate protective film (the first protective film and the second protective film) are substantially orthogonal to each other from the viewpoint of the producing suitability in a roll-to-roll process. Here, the absorption axis of the polarizer and the TD direction of the polarization plate protective film being substantially orthogonal to each other means that the angel formed by the absorption axis of the polarizer and the TD direction of the polarization plate protective film is in a range of 85° to 95°, and preferably in a range of 89° to 91°. When the deviation from being orthogonal is within 5° (preferably within 1°), the polarization degree performance under a polarization plate cross Nichol is not easily degraded, and the leakage of light does not easily occur, which is preferable.

Figure 2:
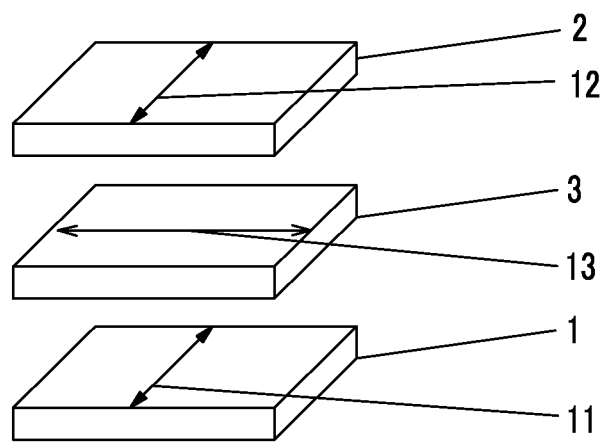
FIG. 2 is a schematic view illustrating an example of the polarization plate of the present invention.

FIG. 2 illustrates an example of the polarization plate of the present invention. In FIG. 2, the absorption axis 13 of the polarizer 3 and the TD direction 11 of the first protective film 1 during the producing of the film and the TD direction 12 of the second protective film 2 during the producing of the film are orthogonal to each other.

[Polarization Plate]

<Performance of Polarization Plate>

The preferable optical characteristics and the like of the polarization plate of the present invention are described in 0238 to 0255 of JP2007-086748A, and these characteristics are preferably satisfied.

<Shape and Configuration>

Regarding the shape of the polarization plate of the present invention, the polarization plate may have a shape of a film piece cut into a size that can be assembled into the liquid crystal display, and also may have a shape in which the polarization plate is produced to be long through continuous production, and is wound in a roll form (for example, a shape in which the roll length is 2500 m or longer or 3900 m or longer). To be used for a large screen liquid crystal display, the width of the polarization plate is preferably set to 1470 mm or more.

The polarization plate of the present invention includes the polarizer and the polarization plate protective films laminated on both surfaces of the polarizer. Among the two polarization plate protective films, the film on the side of the liquid crystal cell when attached to the liquid crystal cell is called the inner side film, and the film on the opposite side is called the outer side film. It is preferable that the first protective film serve as the inner side film and the second protective film serve as the outer side film. In addition, the polarization plate of the present invention includes an adhesive layer on the surface of the first protective film (inner side film), and may be attached to a liquid crystal plate (liquid crystal cell) through the adhesive layer.

In this case, the polarization plate of the present invention may include the adhesive layer, the first protective film (inner side film), the polarizer, and the second protective film (outer side film) in this order.

The polarization plate of the present invention is also preferably configured by further attaching a protective film to one surface of the polarization plate and a separation film to the opposite surface.

The protective film and the separation film are used to protect the polarization plate during the shipping of the polarization plate, the inspection of products, and the like. In this case, the protective film is attached to protect the surface of the polarization plate, and is used on the opposite surface side to a surface on which the polarization plate is attached to the liquid crystal plate. The separation film is used to cover the adhesive layer that attaches the polarizer to the liquid crystal plate, and is used on a surface side on which the polarization plate is attached to the liquid crystal plate.

<Functionalization of Polarization Plate>

The polarization plate of the present invention is preferably used as a functionalized polarization plate combined with an optical film having functional layers such as an antireflection film for improving the observability of a display, a brightness-improving film, a hard coat layer, a front scattering layer, and an anti-glare (glare-proof) layer. The antireflection film, the brightness-improving film, other functional optical films, the hard coat layer, the front scattering layer, and the anti-glare layer which are used for functionalization are described in 0257 and 0276 of JP2007-86748A, and it is possible to produce a polarization plate functionalized on the basis of the above-described description.

(3-1) Antireflection Film

The polarization plate of the present invention can be used in combination with an antireflection film. As the antireflection film, any of a film having a reflection ratio of approximately 1.5% which is produced by supplying a single layer of a low-refractive index material such as a fluorine-based polymer and a film having a reflection ratio of 1% or less in which the multilayer interference of a thin film is used can be used. In the present invention, a configuration in which a low-refractive index layer and at least one layer (that is, a high-refractive index layer and a middle-refractive index layer) having a higher refractive index than the low-refractive index layer are laminated on a transparent support is preferably used. In addition, it is also possible to use the antireflection film described in Nitto Technical Report, Vol. 38, No. 1, May, 2000, pp. 26 to 28 and JP2002-301783A.

The refractive indexes of the respective layers satisfy the following relationship.

The refractive index of the high-refractive index layer>the refractive index of the middle-refractive index layer>the refractive index of the transparent support>the refractive index of the low-refractive index layer As the transparent support used for the antireflection film, a transparent polymer film used for the protective films of the polarizer can be preferably used.

The refractive index of the low-refractive index layer is preferably in a range of 1.20 to 1.55, and more preferably in a range of 1.30 to 1.50. The low-refractive index layer is preferably used as an outermost layer having abrasion resistance and an antifouling property. It is also preferably carried out to impart a sliding property to the surface using a material such as a silicone-containing compound containing a silicone group or a fluorine-containing compound containing fluorine to improve the abrasion resistance.

As the fluorine-containing compound, it is possible to preferably use, for example, the compounds described in 0018 to 0026 of JP 1997-222503A (JP-H9-222503A), 0019 to 0030 of JP1999-38202A (JP-H11-38202A), 0027 and 0028 of JP2001-40284A, and JP2000-284102A.

The silicone-containing compound is preferably a compound having a polysiloxane structure, and it is also possible to use reactive silicone (for example, SILAPRENE (manufactured by Chisso Corporation) or polysiloxane containing a silanol group at both ends (JP1999-258403A (JP-H11-258403A) and the like. An organic metal compound such as a silane coupling agent and a specific silane coupling agent containing a fluorine-containing hydrocarbon group may be cured through a condensation reaction in the co-presence of a catalyst (the compounds and the like described in JP1983-142958A (JP-S58-142958A), JP1983-147483A (JP-S58-147483A), JP1983-147484A (JP-S58-147484A), JP1997-157582A (JP-H9-157582A), JP1999-106704A (JP-H11-106704A), JP2000-117902A, and JP2001-48590A, JP2002-53804A).

It is also possible to preferably add a filler (for example, a low-refractive index inorganic compound having an average primary particle diameter in a range of 1 nm to 150 nm such as silicon dioxide (silica) or fluorine-containing particles (magnesium fluoride, potassium fluoride, or barium fluoride), the organic fine particles described in 0020 to 0038 of JP1999-3820A (JP-H11-3820A, or the like), a silane coupling agent, a lubricant, a surfactant, and the like to the low-refractive index layer as additives other than what has been described above.

The low-refractive index layer may be formed using a gas phase method (a vacuum deposition method, a sputtering method, an ion plating method, a plasma CVD method, or the like), but is preferably formed using a coating method since the low-refractive index layer can be formed at a low cost. As the coating method, a dip coating method, an air knife coating method, a curtain coating method, a roller coating method, a wire bar coating method, a gravure coating method, or a micro gravure method can be preferably used.

The film thickness of the low-refractive index layer is preferably in a range of 30 nm to 200 nm, more preferably in a range of 50 nm to 150 nm, and most preferably in a range of 60 nm to 120 nm.

The middle-refractive index layer and the high-refractive index layer preferably have a configuration in which the ultrafine particles of a high-refractive index inorganic compound having an average particle size of 100 nm or less are dispersed in a matrix material. As the ultrafine particles of the high-refractive index inorganic compound, it is possible to preferably use an inorganic compound having a refractive index of 1.65 or more, for example, oxides of Ti, Zn, Sb, Sn, Zr, Ce, Ta, La, In, and the like, complex oxides containing the above-described metal atoms, and the like.

The above-described ultrafine particles can be used in an aspect in which the particle surfaces are treated using a surface treatment agent (a silane coupling agent or the like: JP1999-295503A (JP-H11-295503A), JP1999-153703A (JP-H11-153703A), JP2000-9908A, an organic metal coupling agent or anionic compounds: JP2001-310432A, or the like), the ultrafine particles are given a core shell structure in which high-refractive index particles are used as a core (JP2001-166104A), a specific dispersant is jointly used (for example, JP1999-153703A (JP-H11-153703A, the specification of U.S. Pat. No. 6,210,858B1, JP2002-2776069A, and the like)), or the like.

As the matrix material, a well-known thermoplastic resin, thermosetting resin film, or the like of the related art can be used, and it is also possible to use a curable film obtained from the polyfunctional materials described in JP2000-47004A, JP2001-315242A, JP2001-31871A, JP2001-296401A, and the like or the metal alkoxide compositions described in JP2001-293818A and the like.

The refractive index of the high-refractive index layer is preferably in a range of 1.70 to 2.20. The thickness of the high-refractive index layer is preferably in a range of 5 nm to 10 μm, and more preferably in a range of 10 nm to 1 μm.

The refractive index of the middle-refractive index layer is adjusted to be a number between the refractive index of the low-refractive index layer and the refractive index of the high-refractive index layer. The refractive index of the middle-refractive index layer is preferably in a range of 1.50 to 1.70.

The haze of the antireflection film is preferably 5% or less, and more preferably 3% or less. In addition, the strength of the film is preferably H or higher, more preferably 2H or higher, and most preferably 3H or higher in the pencil hardness test according to JIS K5400.

(3-2) Brightness-Improving Film

The polarization plate of the present invention can be used in combination with a brightness-improving film. The brightness-improving film has a circularly-polarized light or linearly-polarized light separation function, is disposed between the polarization plate and a back light, and reflects or scatters one circularly-polarized light or linearly-polarized light backward to the back light side. Since light re-reflected from the back light unit has a partially changed polarized light state, and partially transmits the brightness-improving film and the polarization plate when entering the brightness-improving film and the polarization plate again, the repetition of this process improves the light utilization ratio, and the front surface brightness improves by approximately 1.4 times. An anisotropic reflection-type brightness-improving film and an anisotropic scattering-type brightness-improving film are known as the brightness-improving film, and both brightness-improving films can be combined with the polarization plate in the present invention.

As the anisotropic reflection-type brightness-improving film, a brightness-improving film in which uniaxially-stretched films and unstretched films are multiply laminated so as to increase the difference in the refractive index in the stretching direction, thereby producing the anisotropy of the reflection ratio and the transmittance is known, and a multilayer film-type brightness-improving film for which the principle of a dielectric mirror is used (the specifications of WO95/17691A, WO95/17692A, and WO95/17699A) or a cholesteric liquid crystal-type brightness-improving film (the specification of EP606940A2B, and JP1996-271731A (JP-H8-271731A)) is known. In the present invention, DBEF-E, EBEF-D, and DBEF-M (all manufactured by 3M Company) are preferably used as the multilayer film-type brightness-improving film for which the principle of a dielectric mirror is used, and NIPOCS (manufactured by Nitto Denko Corporation) is preferably used as the cholesteric liquid crystal-type brightness-improving film. Regarding NIPOCS, Nitto Technical Report, Vol. 38, No. 1, May, 2000, pp. 19 to 21 and the like can be referenced.

In addition, in the present invention, the polarization plate is also preferably used in combination with an anisotropic scattering-type brightness-improving film obtained by blending a positive intrinsic birefringent polymer and a negative intrinsic birefringent polymer and then uniaxially stretching the blended polymers which is described in the specifications of WO97/32223A, WO97/32224A, WO97/32225A, WO97/32226A, JP1997-274108A (JP-H9-274108A), and JP1999-174231A (JP-H11-174231A). As the anisotropic scattering-type brightness-improving film, DRPF-H (manufactured by 3M Company) is preferred.

Furthermore, the polarization plate of the present invention is also preferably used in combination with a functional optical film provided with the hard coat layer, the front scattering layer, the anti-glare (glare-proof) layer, a gas barrier layer, a lubricating layer, an antistatic layer, a basecoat layer or a protective layer, and the like. In addition, these functional layers are also preferably used in a form in which the functional layers are mutually combined with the antireflection layer in the above-described antireflection film, the optical anisotropic layer, or the like in the same layer. These functional layers can be provided on any one surface or both surfaces of the polarizer side surface and the opposite side surface (surface closer to air) to the polarizer.

(3-3) Hard Coat Layer

The polarization plate of the present invention is preferably combined with a functional optical film provided with a hard coat layer on the surface of the transparent support to impart a dynamic strength such as abrasion resistance. In a case in which the hard coat layer is applied to the above-described antireflection film, the hard coat layer is preferably provided particularly between the transparent support and the high-refractive index layer.

The hard coat layer is preferably formed through a crosslinking reaction or polymerization reaction of a curable compound using light and/or heat. The curable functional group is preferably a photopolymerizable functional group, and an organic metal compound containing a hydrolyzable functional group is preferably an organic alkoxy silyl compound. As the specific constituent composition of the hard coat layer, it is possible to preferably use, for example, the compositions described in JP2002-144913A, JP2000-9908A, and WO00/46617A.

The film thickness of the hard coat layer is preferably in a range of 0.2 μm to 100 μm.

The strength of the hard coat layer is preferably H or higher, more preferably 2H or higher, and most preferably 3H or higher in the pencil hardness test according to JIS K5400. In addition, in the taber test according to JIS K5400, the wear amount of a test specimen before and after the test is preferably smaller.

As the material forming the hard coat layer, a compound containing an ethylenic unsaturated group and a compound containing an open-ring polymerizable group can be used, and these compounds can be used singly or in combination. Preferable examples of the compound containing an ethylenic unsaturated group include polyacrylates of a polyol such as ethylene glycol diacrylate, trimethylolpropane triacrylate, ditrimethylolpropane tetraacrylate, pentaerythritol triacrylate, pentaerythritol tetraacrylate, dipentaerythritol pentaacrylate, and dipentaerythritol hexaacrylate; epoxy acrylates such as diacrylates of bisphenol A diglycidyl ether and diacrylates of hexanediol diglycidyl ether; and urethane acrylates obtained through a reaction between polyisocyanate and a hydroxyl group-containing acrylate such as hydroxyl ethyl acrylate. In addition, examples of commercially available compounds include EBECRYL-600™, EBECRYL-40™, EBECRYL-140™, EBECRYL-1150™, EBECRYL-1290K™, IRR214™, EBECRYL-2220™, TMPTA™, TMPTMA™ (all manufactured by Daicel-UCB Company, Ltd.), UV-6300™, UV-1700B™ (all manufactured by The Nippon Synthetic Chemical Industry Co., Ltd.), and the like.

In addition, preferable examples of the compound containing an open-ring polymerizable group include, as glycidyl ethers, ethylene glycol diglycidyl ether, bisphenol A diglycidyl ether, trimethylol ethane triglycidyl ether, trimethylol propantriglycidyl ether, glycerol triglycidyl ether, triglycidyl trishydroxyethyl isocyanurate, sorbitol tetraglycidyl ether, pentaerythritol tetraglycyl ether, polyglycidyl ethers of a cresol novolac resin, polyglycidyl ether of a phenol novolac resin, and the like; as alicyclic epoxies, CELLOXIDE 2021P™, CELLOXIDE 2081™, EPOLEAD GT-301™, EPOLEAD GT-401™, EHPE3150CE™ (all manufactured by Daicel Corporation), polycyclohexyl epoxy methyl ethers of a phenol novolac resin, and the like; and as oxetanes, OXT-121™, OXT-221™, OX-SQ™, PNOX-1009™ (all manufactured by Toagosei Company, Limited), and the like. In addition, it is also possible to use polymers of glycidyl (meth)acrylate and copolymers with a monomer that can be copolymerized with glycidyl (meth) acrylate for the hard coat layer.

It is also preferable to add fine particles of oxides such as silicon, titanium, zirconium, and aluminum; crosslinking particles of polyethylene polystyrene, poly (meth)acrylic acid esters, polydimethyl siloxane, and the like; crosslinking fine particles such as organic fine particles such as crosslinking rubber fine particles of SBR, NBR, and the like to the hard coat layer to reduce the curing shrinkage of the hard coat layer, improve the adhesiveness with the base material, and reduce the curling of a hard coating-treated product in the present invention. The average particle size of these crosslinking fine particles is preferably in a range of 1 nm to 20000 nm. In addition, as the shape of the crosslinking fine particles, a spherical shape, a rod shape, a needle shape, a plate shape, and the like can be used with no particular limitation. The amount of the fine particles added is preferably 60 vol % or less, and more preferably 40 vol % or less of the cured hard coat layer.

In a case in which the above-described inorganic fine particles are added, generally, the inorganic fine particles have a poor affinity to a binder polymer, and therefore it is also preferable to carry out a surface treatment using a surface treatment agent including metal such as silicon, aluminum, or titanium, and having a functional group such as an alkoxide group, a carboxylic acid group, a sulfonic acid group, or a phosphorous acid group.

The hard coat layer is preferably cured using heat or an active energy ray, and, out of the heat and the active energy ray, the active energy ray such as a radioactive ray, a gamma ray, an alpha ray, an electron ray, or an ultraviolet ray is preferably used, and an electron ray and an ultraviolet ray are particularly preferred in consideration of safety and productivity. In a case in which the hard coat layer is cured using heat, the heating temperature is preferably 140° C. or lower, and more preferably 100° C. or lower in consideration of the thermal resistance of plastic.

(3-4) Front Scattering Layer

The front scattering layer is used to improve the viewing angle characteristics (hue and brightness distribution) in all directions when the polarization plate of the present invention is applied to the liquid crystal display. In the present invention, the front scattering layer preferably has a configuration in which fine particles having different refractive indexes are binder-dispersed, and it is possible to use, for example, the configuration described in JP1999-38208A (JP-H11-38208A) in which the front scattering coefficient is specified, the configuration described in JP2000-199809A in which the relative refractive index between a transparent resin and fine particles is set in a specific range, the configuration described in JP2002-107512A in which the haze value is set to 40% or more, or the like. In addition, to control the viewing angle characteristics of the haze, it is possible to preferably use the polarization plate of the present invention in combination with "LUMISTY" described in pp. 31 to 39 of the technical report "Optical functional film" by Sumitomo Chemical Company, Limited.

(3-5) Anti-Glare Layer

The anti-glare (glare-proof) layer is used to prevent reflected glare by scattering reflected light. An anti-glare function can be obtained by forming protrusions and recesses on the outermost surface (display side) of the liquid crystal display. The haze of an optical film having the anti-glare function is preferably in a range of 3% to 30%, more preferably in a range of 5% to 20%, and most preferably in a range of 7% to 20%.

As the method for forming protrusions and recesses on the film surface, it is possible to preferably use, for example, a method in which protrusions and recesses are formed on the film surface by adding fine particles (for example, JP2000-271878A), a method in which a film with an uneven surface is formed by adding a small amount (0.1 mass % to 50 mass %) of relatively large particles (particle size in a range of 0.05 μm to 2 μm) (for example, JP2000-281410A, JP2000-95893A, JP2001-100004A, JP2001-281407A, and the like), a method in which an uneven shape is physically transferred to the film surface (for example, as an emboss processing method, JP1979-278839A (JP-S63-278839A, JP1999-183710A (JP-H11-183710A, JP2000-275401A)), and the like.

[Liquid Crystal Display]

The liquid crystal display of the present invention includes the polarization plate of the present invention as at least one of a back light side polarization plate and a viewing side polarization plate.

Particularly, the liquid crystal display preferably includes the first protective film formed by including the (meth)acryl-based resin in the polarization plate of the present invention so as to be positioned on the side of the liquid crystal (inner side).

Figure 3:
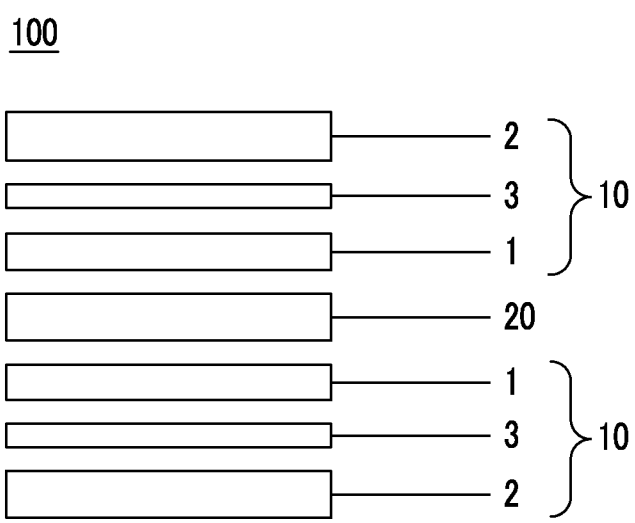
FIG. 3 is a schematic view illustrating an example of a liquid crystal display of the present invention.

A schematic view of a preferable example of the liquid crystal display of the present invention is illustrated in FIG. 3.

A liquid crystal display 100 illustrated in FIG. 3 includes the polarization plates 10 of the present invention including a first protective film 1, a polarizer 3, and a second protective film 2 on both sides of a liquid crystal cell 20. The liquid crystal display 100 includes the polarization plates 10 so that the first protective film 1 is disposed on the side of the liquid crystal cell 20 (inner side). At this time, the first protective film may be adhered to the liquid crystal cell through an adhesive layer.

To produce a normally black liquid crystal display, the two polarization plates 10 are preferably disposed so that the absorption axes of the polarizers 3 are orthogonal to each other.

EXAMPLES

Hereinafter, the present invention will be specifically described using examples. Materials, reagents, mass amounts, ratios thereof, operations, and the like described in the following examples can be appropriately changed within the purpose of the present invention. Therefore, the scope of the present invention is not limited to the following specific examples.

{Production of Inner Side Film (First Protective Film)}

[Film 1]

A pellet of [a mixture of 90 parts by mass of the (meth)acryl-based resin having a lactone ring structure expressed by the following expression (1A) {the mass ratio of copolymerizable monomers=methyl methacrylate/2-(hydroxymethyl) methyl acrylate=8/2, the lactone ring-forming ratio=approximately 100%, the content ratio of the lactone ring structure=19.4%, the weight-average molecular weight=133000, the melt flow rate=6.5 g/10 minutes (240° C., 10 kgf), Tg 131° C.} and 10 parts by mass of an acrylonitrile-styrene (AS) resin (TOYO AS AS20, manufactured by Toyo Styrene Co., Ltd.); Tg 127° C.] was supplied to a twin screw extruder, was melted at approximately 280° C., and was extruded into a sheet shape, thereby obtaining a 70 μm-thick (meth)acryl-based resin sheet having a lactone ring structure. This unstretched sheet was stretched twice in the lengthwise direction and 2.4 times in the widthwise direction under a temperature condition of 160° C., thereby obtaining a film 11 (thickness: 25 μm, in-plane phase difference Δnd: 0.8 nm, and thicknesswise phase difference Rth: 1.5 nm) which was a (meth)acryl-based resin film.

[Chem. 1]

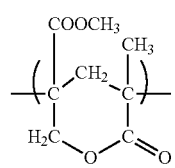

(IA)

[Film 2]

A methyl methacrylate-styrene copolymer (MS resin) (styrene amount: 11 mol %) having a molecular weight of 100000 as a raw material resin, and monomethyl amine as an imidization agent were used, thereby obtaining an imidized MS resin.

In detail, an intermeshed co-rotation twin screw extruder having an opening diameter of 15 mm was used. The temperatures of individual temperature adjustment zones in the extruder were set in a range of 230° C. to 250° C., and the screw rotation speed was set to 150 rpm. The methyl methacrylate-styrene copolymer (MS resin) was supplied at 2 kg/hr, the MS resin was melted and fully loaded using a kneading block, and 16 parts by mass of monomethyl amine (manufactured by Mitsubishi Gas Chemical Company, Inc.) with respect to the MS resin was infused from a nozzle. The reaction zone having a reverse flight at the terminal of the reaction zone was fulfilled with MS resin. Byproducts and excessive methyl amine after the reaction were removed by reducing the pressure at a vent opening to −0.092 MPa. The resin discharged in a strand shape from a die provided at the outlet of the extruder was cooled in a water bath, and then was pelletized using a pelletizer, thereby obtaining an imidized MS resin (1).

Next, in the intermeshed co-rotation twin screw extruder having an opening diameter of 15 mm, the temperatures of the respective temperature adjustment zones in the extruder were set to 230° C., and the screw rotation speed was set to 150 rpm. The imidized MS resin (1) was supplied at 1 kg/hr from a hopper, the imidized MS resin was melted and fully loaded using a kneading block, and a liquid mixture of 0.8 parts by mass of dimethyl carbonate and 0.2 parts by mass of triethyl amine with respect to the imidized MS resin was infused from a nozzle, thereby reducing a carboxyl group in the imidized MS resin. The reaction zone having a reverse flight at the terminal of the reaction zone was fulfilled with imidized MS resin. Byproducts and excessive dimethyl carbonate after the reaction were removed by reducing the pressure at a vent opening to −0.092 MPa. The resin discharged in a strand shape from the die provided at the outlet of the extruder was cooled in a water bath, and then was pelletized using a pelletizer, thereby obtaining an imidized MS resin (2) having a reduced acid value.

Furthermore, the imidized MS resin (2) was injected into the intermeshed co-rotation twin screw extruder having an opening diameter of 15 mm under conditions of the temperatures of the respective temperature adjustment zones in the extruder set to 230° C., the screw rotation speed of 150 rpm, and the supply rate of 1 kg/hr. Volatile components such as unreacted auxiliary materials were removed again by reducing the pressure at the vent opening to −0.095 MPa. The vented imide resin discharged in a strand shape from the die provided at the outlet of the extruder was cooled in a water bath, and then was pelletized using a pelletizer, thereby obtaining an imidized MS resin (3).

A sheet-shaped molten resin obtained by drying the obtained imidized MS resin (3) at 100° C. for five hours, and then extracting the obtained imidized MS resin at 260° C. using a 40 mmϕ single screw extruder and a 400 mm-wide T die was cooled using a cooling roll, thereby obtaining an unstretched film having a width of 300 mm and a thickness of 90 μm.

A biaxially-stretched film (film 2) was produced from the film using a labo drawer (a batch-type uniaxial stretching machine, hot air circulation type, vertical blowing from a slit nozzle, temperature distribution: ±1° C.).

{Production of Outer Side Film (Second Protective Film)}

[Films 3 to 10]

(Degree of Acetyl Substitution)

The degree of acetyl substitution of the cellulose acylate was measured using the following method.

The degree of acetyl substitution was measured according to ASTM D-817-91. The viscosity-average polymerization degree was measured using a limiting viscosity method by Uda et al. {Kazuo UDA and Hideo SAITO, "Journal of the Society of Fiber Science and Technology', Vol. 18, Issue 1, pp 105 to 120 (1962)}.

(Elastic Modulus)

The elastic modulus of the film was measured according to the method described in JIS K 7127.

The winding direction of the film roll was set as the lengthwise direction (MID direction), and the direction orthogonal to the lengthwise direction was set as the widthwise direction (TD direction). The lengthwise direction or the widthwise direction was considered as the measurement direction, and a film specimen having a length of 15 cm and a width of 1 cm was cut out in the measurement direction. The specimen was installed in a STROGRAPH V10-C manufactured by Toyo Seiki Seisaku-sho, Ltd. so that the chuck interval in the lengthwise direction reached 10 cm, a load was added so that the chuck interval expanded at a stretching rate of 10 mm/minute, and the force at that time was measured. The elastic modulus was computed from the thickness, force, and stretching amount of the film that had been measured in advance using a micro meter.

(Humidity Dimensional Change Ratio)

The humidity dimensional change ratio of the film was measured using the following method.

The winding direction of the film roll was set as the lengthwise direction (MID direction), and the direction orthogonal to the lengthwise direction was set as the widthwise direction (TD direction). The lengthwise direction or the widthwise direction was considered as the measurement direction, and a film specimen having a length of 12 cm and a width of 3 cm was cut out in the measurement direction. Pin holes were opened in the specimen in the measurement direction at intervals of 10 cm. After the humidity was adjusted for 24 hours at 25° C. and a relative humidity of 60%, the intervals between the pin holes were measured using a pin gauge. Next, after the humidity of the specimen was adjusted for 24 hours at 25° C. and a relative humidity of 10%, the intervals between the pin holes were measured using a pin gauge. Next, after the humidity of the specimen was adjusted for 24 hours at 25° C. and a relative humidity of 80%, the intervals between the pin holes were measured using a pin gauge. The humidity dimensional change ratio was computed from the following expression using the above-described measurement values, $$\text{humidity dimensional change ratio (\%)} = [\{(\text{length at } 25°\text{ C. and a relative humidity of } 80\%) - (\text{length at } 25°\text{ C. and a relative humidity of } 10\%)\} / (\text{length at } 25°\text{ C. and a relative humidity of } 60\%)] \times 100 \quad \text{Expression (1).}$$

(Production of Film 3)

(1) Preparation of Dope for Intermediate Layer

A dope 1 for an intermediate layer having the following composition was prepared.

Composition of dope 1 for intermediate layer

| | |
|---|---|
| Cellulose acetate (degree of acetylation: 2.86) | 100 parts by mass |
| Methylene chloride (first solvent) | 320 parts by mass |
| Methanol (second solvent) | 83 parts by mass |
| 1-butanol (third solvent) | 3 parts by mass |
| Triphenyl phosphate | 7.6 parts by mass |
| Biphenyl diphenyl phosphate | 3.8 parts by mass |

Specifically, the dope was prepared using the following method.

While a solvent mixture of the first to third solvents was well stirred and dispersed, the cellulose acetate powder (flake), triphenyl phosphate, and biphenyl diphenyl phosphate were gradually added to a 4000 L stainless steel melting tank having a stirring blade, thereby preparing a total of 2000 kg of the dope 1 for an intermediate layer. The respective solvents used had a water content ratio of 0.5 mass % or less.

(2) Preparation of Dope 2 for Support Layer

A matting agent (silicon dioxide (particle diameter: 20 nm)), a peeling promoter (ethyl citrate ester (a mixture of monoethyl ester, diethyl ester, and triethyl ester of citric acid)), and the dope 1 for an intermediate layer were mixed through a stationary mixer, thereby preparing a dope 2 for a support layer. The matting agent, the peeling promoter, and the dope 1 for an intermediate layer were mixed so that the total concentration of the solid content reached 20.5 mass %, the concentration of the matting agent reached 0.05 mass %, and the concentration of the peeling promoter reached 0.03 mass %.

(3) Preparation of Dope 3 for Air Layer

A matting agent (silicon dioxide (particle diameter: 20 nm)) was mixed with the dope 1 for an intermediate layer through a stationary mixer, thereby preparing a dope 3 for an air layer. The matting agent and the dope 1 for an intermediate layer were mixed so that the total concentration of the solid content reached 20.5 mass %, and the concentration of the matting agent reached 0.1 mass %.

(4) Film Formation by Co-Flow Casting

As a flow casting die, an apparatus set to be capable of molding a three-layer-structured film by laminating layers on both surfaces of the main stream by mounting a 1.8 m-wide feed block that had been adjusted for co-flow casting was used. In the following description, a layer formed from the main stream will be called the intermediate layer, the layer on the support surface side will be called a support layer, and the layer on the opposite side surface will be called the air layer. Meanwhile, three solution-sending flow channels for the dope were used for the intermediate layer, the support layer, and the air layer.

The dope 1 for the intermediate layer, the dope 2 for the support layer, and the dope 3 for the air layer were flow-cast together on a drum that had been cooled to 0° C. from a flow-casting opening. At this time, the flow rates of the respective dopes were adjusted so that the thickness ratio among the air layer/the intermediate layer/the support layer reached 4/73/3. The flow-cast dope film was dried on the drum using a drying air at temperature of 30° C., and was peeled from the drum in a state in which the residual solvent amount is 150%. At the time of peeling, the film was stretched 20% in the conveyance direction (lengthwise direction). Furthermore, the film was conveyed between the rolls in a thermal treatment apparatus so as to be further dried, thereby producing a film 3. The produced cellulose acylate film had a residual solvent amount of 0.2% and a thickness of 40 μm.

Films 4 to 6 were produced in the same manner as Film 3 except that during the producing of the film 3, the stretching strength in the conveyance direction at the time of the peeling was adjusted so that the elastic modulus and the humidity dimensional change ratio reached desired values. When the stretching strength in the conveyance direction was weakened, the orientation degree of molecules in the conveyance direction was decreased, and consequently, the elastic modulus in the conveyance direction was reduced, and the humidity dimensional change ratio was increased.

In addition, Film 7 was produced by carrying out a stretching treatment in the widthwise direction while both ends of the film in the widthwise direction (the direction orthogonal to the flow casting direction) were gripped using a pin stenter (the pin stenter illustrated in FIG. 3 of JP 1992-1009A (JP-H4-1009A)). The stretching ratio was adjusted so as to reach a desired property value.

In addition, Films 8 to 10 were produced by adjusting the flow rate when the dope 1 for the intermediate layer, the dope 2 for the support layer, and the dope 3 for the air layer were flow-cast together on the drum that had been cooled to 0° C. from the flow-casting opening. Furthermore, the stretching strength in the conveyance direction at the time of the peeling was adjusted so that the humidity dimensional change ratio reached a desired value. The respective thicknesses were 37.5 μm, 42.5 μm, and 45 μm.

TABLE 1

| Film No. | Thickness (μm) | Elastic modulus (GPa) MD direction | Elastic modulus (GPa) TD direction | Humidity dimensional change ratio (%) MD direction | Humidity dimensional change ratio (%) TD direction |
|---|---|---|---|---|---|
| Film 1 | 25 | 3.4 | 3.3 | 0.25 | 0.25 |
| Film 2 | 25 | 3.1 | 3.1 | 0.25 | 0.25 |
| Film 3 | 40 | 6.0 | 2.5 | 0.20 | 0.70 |
| Film 4 | 40 | 5.5 | 3.0 | 0.20 | 0.60 |
| Film 5 | 40 | 5.0 | 3.5 | 0.25 | 0.50 |
| Film 6 | 40 | 4.5 | 3.8 | 0.30 | 0.45 |
| Film 7 | 40 | 4.0 | 4.0 | 0.40 | 0.40 |
| Film 8 | 37.5 | 5.0 | 3.5 | 0.25 | 0.50 |
| Film 9 | 42.5 | 5.0 | 3.5 | 0.25 | 0.50 |
| Film 10 | 45 | 5.0 | 3.5 | 0.25 | 0.50 |

{Saponification Treatment}

A produced inner side film and a produced outer side film were respectively immersed in an aqueous solution of 2.3 mol/L of sodium hydroxide at 55° C. for three minutes. Next, the films were washed in a water-washing bath at room temperature, and were neutralized at 30° C. using 0.05 mol/L of sulfuric acid. Again, the films were washed in a water-washing bath at room temperature, and furthermore, were dried using hot air at temperature of 100° C. The saponification treatment was carried out on each of the surfaces of the respective films in the above-described manner.

{Production of Polarizer}

200 kg of water at temperature of 18° C. was put into a 500 L tank, 42 kg of a polyvinyl alcohol-based resin having a weight-average molecular weight of 165000 and a saponification degree of 99.8 mol % was added under stirring, and the components were stirred for 15 minutes, thereby obtaining a slurry. The obtained slurry was dehydrated, thereby obtaining a PVA-based resin wet cake having a water content ratio of 40%.

70 kg (resin component: 42 kg) of the obtained PVA-based resin wet cake was put into a dissolving bath, 4.2 kg of glycerin, as a plasticizer, and 10 kg of water were added thereto, and water vapor was blown in from the bath bottom. The components began to be stirred (at a rotation speed: 5 rpm) when the inside resin temperature reached 50° C., the inside of the system was pressurized when the inside resin temperature reached 100° C., and the blowing-in of water vapor was stopped when the inside resin temperature reached 150° C. (the total amount of water vapor blown in was 75 kg). After that, the components were stirred at an increased rotation speed (rotation speed: 20 rpm) for 30 minutes so as to be homogeneously dissolved, and then a polyvinyl alcohol-based resin aqueous solution having a polyvinyl alcohol-based resin concentration of 23% with respect to water was obtained by adjusting the concentration.

Next, the polyvinyl alcohol-based resin aqueous solution (solution temperature: 147° C.) was supplied to an inter-meshed co-rotation twin screw extruder using a supply gear pump, was defoamed, and then was discharged using a discharge gear pump. The discharged polyvinyl alcohol-based resin aqueous solution was flow-cast on a cast drum using a T-shaped slit die (straight manifold die) so as to form a film, thereby obtaining a polyvinyl alcohol film. The conditions for flow casting film formation are as described below.

Cast drum diameter (R1): 3200 mm
Cast drum width: 4.3 m
Cast drum rotation speed: 8 m/minute
Cast drum surface temperature: 90° C.
Resin temperature at the outlet of a T-shaped slit die: 95° C.

The front and back surfaces of the obtained film was dried by alternately passing the film through multiple drying rolls under the following conditions.

Drying roll diameter (R2): 320 mm
Drying roll width: 4.3 m
Number of drying roll (n): 10 rolls
Drying roll rotation speed: 8 m/minute
Drying roll surface temperature: 50° C.

The polyvinyl alcohol film (length: 4000 m, width: 4 m, and thickness: 75 μm) produced above was immersed in warm water at temperature of 40° C. for two minutes, was subjected to a swelling treatment, and then was uniaxially stretched 1.30 times in the lengthwise direction. The obtained film was immersed in an aqueous solution including 28.6 g/L of boric acid (manufactured by Societa Chimica Larderello S.p.A), 0.25 g/L of iodine (manufactured by Junsei Chemical Co., Ltd.), and 1.0 g/L of potassium iodide (manufactured by Junsei Chemical Co., Ltd.) at 30° C. for two minutes, thereby carrying out a dyeing treatment using iodine and an iodide. A boric acid treatment was carried out for five minutes in an aqueous solution at temperature of 50° C. containing 30.0 g/L of boric acid while the film obtained through the dyeing treatment was uniaxially stretched 5.0 times in the lengthwise direction. A drying treatment was carried out on the obtained film for nine minutes at 70° C., thereby obtaining a polarizer.

[Preparation of Adhesive]

10 parts by mass of polyester-based urethane (manufactured by Mitsui Takeda Chemicals Inc., TAKELAC XW-74-C154) and 1 part by mass of an isocyanate-based crosslinking agent (manufactured by Mitsui Takeda Chemicals Inc., TAKENATE WD-725) were dissolved in water, thereby preparing a solution having a solid content adjusted to 20 mass %. This solution was used as an adhesive.

{Production of Polarization Plate}

The inner side film that had been produced using the above-described method and had been subjected to the saponification treatment was attached to a single side of the polarizer produced by the above-described method using the above-described adhesive. Next, the outer side film that had been produced using the above-described method and had been subjected to the saponification treatment was attached to the surface of the polarizer on the opposite side of the side to which the inner side film was attached using the above-described adhesive.

At this time, the inner side film and the outer side film were disposed so that the absorption axis of the produced polarizer and the TD directions of the inner side film and the outer side film were orthogonal to each other.

Polarization plates 1 to 13 were produced in the above-described manner. The configurations of the produced polarization plates are described in Table 2.

[Curling Evaluation]

A specimen having a size of 15 cm (TD)×15 cm (MD) was cut out from the polarization plate obtained in the above-described manner, was left to stand in a temperature and humidity environment of 25° C. and a relative humidity of 60% for four hours, and then the upward bending amount at the four corners was measured. The results are described in Table 2. At this time, the upward bending amount when the outer side film was positioned upward is considered as a plus amount. When the sample was bent toward the inner side after being left to stand, it was not possible to measure the upward bending amount using a JIS-JQA1-class rule (herein, straight rule manufactured by Shinwa Rules Co., Ltd., serial number 130005) even when the outer side film was positioned upward, and therefore the upward bending amount was measured with the inner side film positioned upward by turning the top and bottom of the film over, and a negative sign-given amount was obtained. Meanwhile, the specimen was cut out from the center portion of the polarization plate.

The evaluation standard of the upward bending amount at the four corners is most preferably in a range of 5 mm to less than 9 mm (evaluation: AA), second most preferably in a range of 4 mm to less than 5 mm or in a range of 9 mm to less than 10 mm (evaluation: A), third most preferably in a range of −2 mm to less than 4 mm or in a range of 10 mm to less than 16 mm (evaluation: B), and not preferably less than −2 mm and 16 mm or more (evaluation: C). As described above, when the upward bending amount is a negative amount, bubbles are likely to enter when the polarization plate is attached to the liquid crystal cell, which is not preferable. The curling of the polarization plate is easily changed depending on the influence of temperature and humidity; however, even in a case in which the temperature and the humidity are changed, the upward bending amount is preferably a positive amount. In addition, even when the upward bending amount is a positive amount, an excessively positive amount makes the alignment during the attachment to the liquid crystal cell difficult, and therefore the upward bending amount of 16 mm or more is not preferable.

TABLE 2

| Polarization plate specimen No. | Inner side film | Outer side film | Average value of curling at four corners | Determination | Note |
|---|---|---|---|---|---|
| 1 | Film 1 | Film 3 | 10 mm | B | Example |
| 2 | Film 1 | Film 4 | 6 mm | AA | Example |
| 3 | Film 1 | Film 5 | 2 mm | B | Example |
| 4 | Film 1 | Film 6 | 0 mm | B | Example |
| 5 | Film 1 | Film 7 | −3 mm | C | Comparative Example |
| 6 | Film 2 | Film 3 | 9 mm | A | Example |
| 7 | Film 2 | Film 4 | 5 mm | AA | Example |
| 8 | Film 2 | Film 5 | 1 mm | B | Example |
| 9 | Film 2 | Film 6 | −1 mm | B | Example |
| 10 | Film 2 | Film 7 | −3 mm | C | Comparative Example |
| 11 | Film 1 | Film 8 | 1 mm | B | Example |
| 12 | Film 1 | Film 9 | −1 mm | B | Example |
| 13 | Film 1 | Film 10 | −2 mm | B | Example |

The present examples have described an aspect in which the hard coat layer is not present on the surface of the outer side film, but it is considered that the same tendency is obtained even in an aspect in which the hard coat layer is present on the surface of the outer side film.

What is claimed is:

1. A polarization plate comprising:
a first protective film;
a polarizer; and
a second protective film in this order,
wherein the first protective film is a film including a (meth)acryl-based resin, a thickness of the first protective film is in a range of 20 μm to 30 μm, an elastic modulus of the first protective film in a direction orthogonal to an absorption axis of the polarizer is in a range of 3.0 GPa to 3.5 GPa,
a thickness of the second protective film is in a range of 1.5 times to 1.8 times of the thickness of the first protective film, and
a humidity dimensional change ratio of the second protective film in the direction orthogonal to the absorption axis of the polarizer, which is expressed by the following expression (1), is in a range of 0.45% to 0.8%, humidity dimensional change ratio (%)=[{(length at 25° C. and a relative humidity of 80%)−(length at 25° C. and a relative humidity of 10%)}/(length at 25° C. and a relative humidity of 60%)]×100     Expression (1), and wherein a humidity dimensional change ratio of the first protective film in the direction orthogonal to the absorption axis of the polarizer, which is expressed by the above-described expression (1) is in a range of 0.20% to 0.30%,
the transverse direction (TD) of the first protective film is the direction orthogonal to the absorption axis of the polarizer, and
the TD direction of the second protective film is the direction orthogonal to the absorption axis of the polarizer.

2. The polarization plate according to claim 1,
wherein the humidity dimensional change ratio of the second protective film in the direction orthogonal to the absorption axis of the polarizer, which is expressed by the above-described expression (1) is in a range of 0.55% to less than 0.65%.

3. The polarization plate according to claim 1,
wherein an elastic modulus of the second protective film in the direction orthogonal to the absorption axis of the polarizer is in a range of 2.8 GPa to less than 3.3 GPa.

4. The polarization plate according to claim 1,
wherein the humidity dimensional change ratio of the second protective film in the direction orthogonal to the absorption axis of the polarizer, which is expressed by the above-described expression (1), is in a range of 0.55% to less than 0.65%, and the elastic modulus of the second protective film in the direction orthogonal to the absorption axis of the polarizer is in a range of 2.8 GPa to less than 3.3 GPa.

5. The polarization plate according to claim 1,
wherein the second protective film is a film including cellulose acylate.

6. The polarization plate according to claim 1,
wherein an adhesive layer, the first protective film, the polarizer, and the second protective film are included in this order.

7. A liquid crystal display comprising:
a liquid crystal cell; and
at least one polarization plate according to claim 1,
wherein the first protective film in the polarization plate is disposed on a side of the liquid crystal cell.

* * * * *